United States Patent
Du et al.

(10) Patent No.: US 7,106,508 B2
(45) Date of Patent: Sep. 12, 2006

(54) HYBRID CELL

(75) Inventors: Tengda Du, Fremont, CA (US); Xin Luo, Sunnyvale, CA (US); Ping Xie, Cupertino, CA (US); Evan Green, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 164 days.

(21) Appl. No.: 10/654,261

(22) Filed: Sep. 3, 2003

(65) Prior Publication Data

US 2005/0111772 A1 May 26, 2005

Related U.S. Application Data

(63) Continuation-in-part of application No. 09/879,026, filed on Jun. 11, 2001, now Pat. No. 6,694,066.

(60) Provisional application No. 60/408,185, filed on Sep. 3, 2002.

(51) Int. Cl.
G02B 27/28 (2006.01)

(52) U.S. Cl. ............... 359/498; 359/495; 359/496; 398/65

(58) Field of Classification Search ............ 359/498, 359/495, 496; 398/65.74, 75
See application file for complete search history.

(56) References Cited

U.S. PATENT DOCUMENTS

| | | | |
|---|---|---|---|
| 3,529,885 A * | 9/1970 | Ammann | 359/499 |
| 4,094,581 A | 6/1978 | Baldwin | |
| 4,685,773 A * | 8/1987 | Carlsen et al. | 359/495 |
| 4,813,761 A | 3/1989 | Davis et al. | |
| 4,987,567 A | 1/1991 | Buhrer | |
| 5,319,483 A | 6/1994 | Krasinski et al. | |
| 5,606,439 A | 2/1997 | Wu | |
| 5,694,205 A * | 12/1997 | Gualtieri et al. | 356/33 |
| 5,694,233 A | 12/1997 | Wu et al. | |
| 5,710,845 A | 1/1998 | Tajima | |
| 5,867,291 A | 2/1999 | Wu et al. | |
| 5,894,532 A | 4/1999 | Moores | |
| 6,005,697 A | 12/1999 | Wu et al. | |
| 6,208,444 B1 | 3/2001 | Wong et al. | |
| 6,437,916 B1 * | 8/2002 | McLeod et al. | 359/499 |
| 6,741,813 B1 * | 5/2004 | Su et al. | 398/79 |
| 2002/0085252 A1* | 7/2002 | Chen et al. | 359/122 |
| 2002/0093662 A1* | 7/2002 | Chen et al. | 356/491 |
| 2002/0159151 A1* | 10/2002 | Li | 359/498 |

OTHER PUBLICATIONS

"Extinction Ratio and Power Penalty," Maxim High-Frequency/Fiber Communications Group, Application Note HFAN-2.2.0 (Rev. 0, May 2001).

* cited by examiner

*Primary Examiner*—Mark A. Robinson
*Assistant Examiner*—Lee Fineman
(74) *Attorney, Agent, or Firm*—Workman Nydegger

(57) ABSTRACT

The present invention is a hybrid cell that utilizes a PBS pair in conjunction with a wedge tuner and a crystal to achieve a more stable interleaver. A first PBS splits an incoming optical signal into two orthogonally polarized beams which follow different optical paths through the cell. The length of the wedge tuner and crystal are selected such that the periodicity of the cell is approximately inversely proportional to the free spectral range at a target frequency. The length of the wedge tuner and crystal are also selected such that there is no change in an optical path difference between the two optical paths with respect to a change in temperature over an operating temperature range.

14 Claims, 13 Drawing Sheets

POLARIZATION MODE

INTENSITY MODE

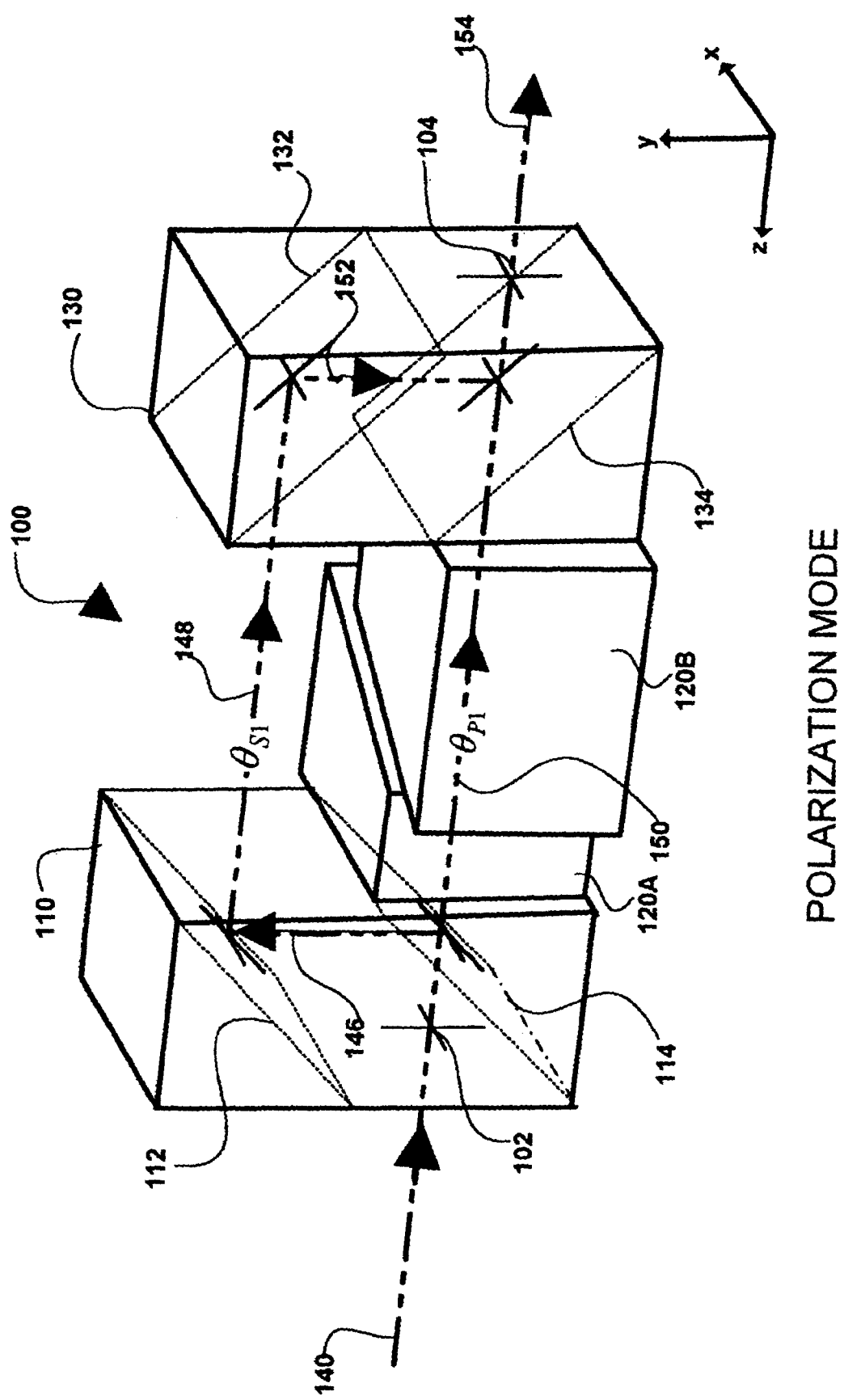
Fig. 1C  POLARIZATION MODE

INTENSITY MODE

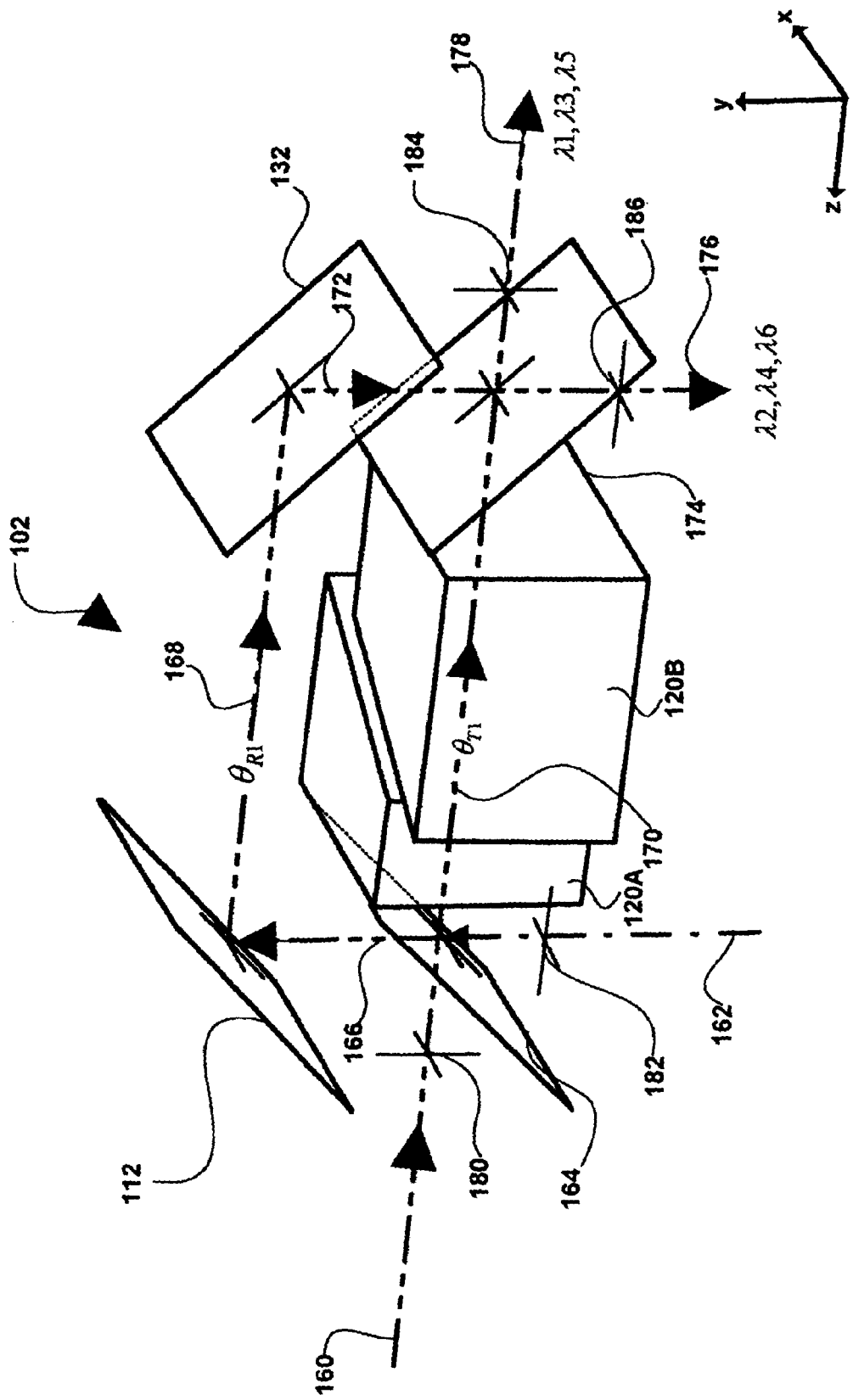
Fig. 1E INTENSITY MODE

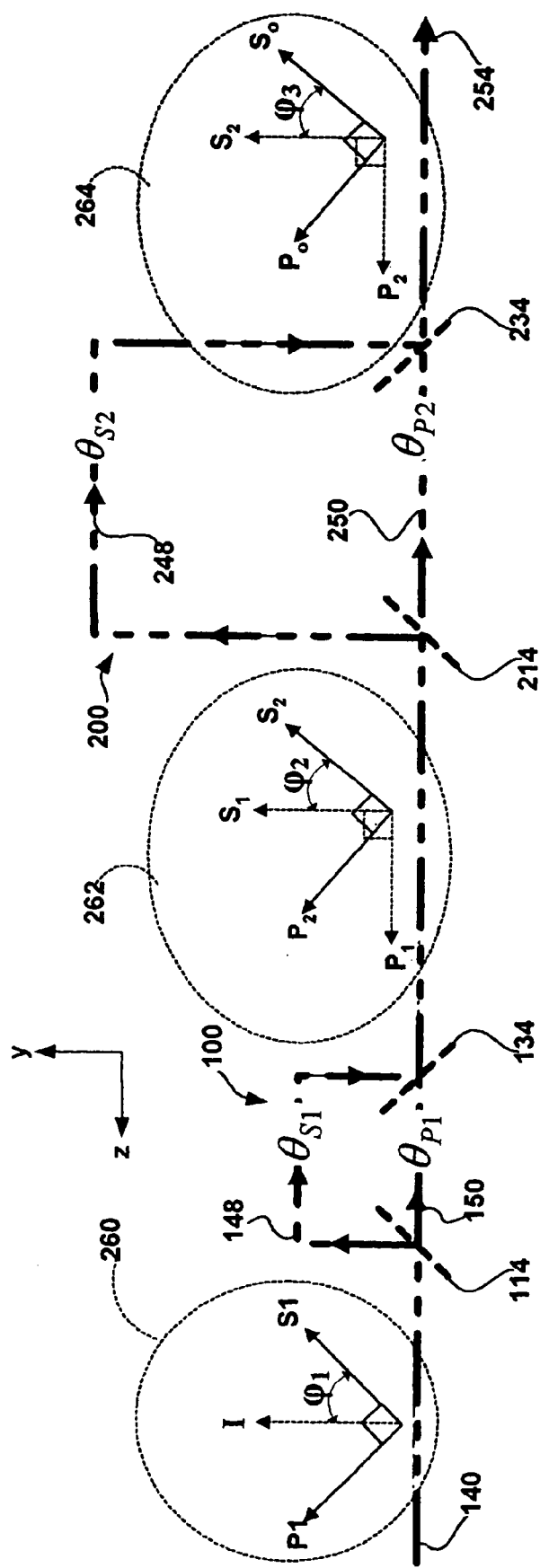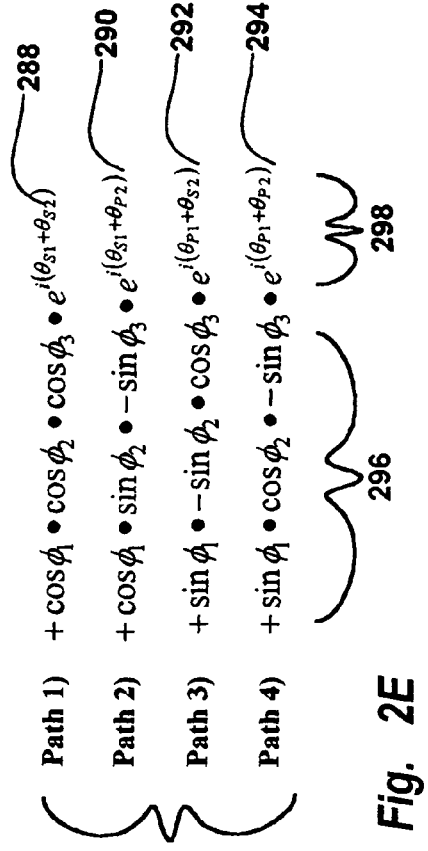
Fig. 2D
Fig. 2E
Path 1) $+\cos\phi_1 \bullet \cos\phi_2 \bullet \cos\phi_3 \bullet e^{i(\theta_{S1}+\theta_{S2})}$ — 288
Path 2) $+\cos\phi_1 \bullet \sin\phi_2 \bullet -\sin\phi_3 \bullet e^{i(\theta_{S1}+\theta_{P2})}$ — 290
Path 3) $+\sin\phi_1 \bullet -\sin\phi_2 \bullet \cos\phi_3 \bullet e^{i(\theta_{P1}+\theta_{S2})}$ — 292
Path 4) $+\sin\phi_1 \bullet \cos\phi_2 \bullet -\sin\phi_3 \bullet e^{i(\theta_{P1}+\theta_{P2})}$ — 294

HYBRID CELL

CROSS-REFERENCE TO RELATED APPLICATIONS

This application is a Continuation-in-Part Application of United States Utility patent application Ser. No. 09/879,026, filed on Jun. 11, 2001 now U.S. Pat. No. 6,694,066 and entitled "Method and Apparatus for Optical Filter", which is hereby incorporated by reference in its entirety. The present application also claims priority to and the benefit of U.S. Provisional Patent Application No. 60/408,185, filed on Sep. 3, 2002, and entitled "Hybrid Cell", which is also hereby incorporated by reference in its entirety.

BACKGROUND OF THE INVENTION

1. The Field of the Invention

The present invention relates generally to the field of fiber optic communications, and more specifically, to a hybrid cell usable as an interleaver.

2. The Relevant Technology

The Synchronous Optical Network (SONET) standard defines a hierarchy of multiplexing levels and standard protocols that allow efficient use of the wide bandwidth of fiber optic cable, while providing a means to merge lower level DS0 and DS1 signals into a common medium. Currently optical communication is accomplished by what is known as "wavelength division multiplexing" (WDM), in which separate subscriber/data sessions can be handled concurrently on a single optic fiber by means of modulation of each of those subscriber data streams on different portions, a.k.a. channels, of the light spectrum.

The spacing between channels is constantly being reduced as the resolution and signal separation capabilities of multiplexers and de-multiplexers are improved. Current International Telecommunications Union (ITU) specifications call for channel separations of approximately 0.4 nm, i.e., 50 GigaHertz (GHz). At this channel, separation as many as 128 channels can be supported in C-band alone. Each channel is modulated on a specific center frequency, within the range of 1525–1575 nm, with the center frequency of each channel provided by a corresponding one of 128 semiconductor lasers. The modulated information from each of the semiconductor lasers is combined (multiplexed) onto a single optic fiber for transmission. As the length of a fiber increases, the signal strength decreases. To offset signal attenuation erbium doped fiber amplifiers (EDFAs) are used at selected locations along the communication path to boost signal strength for all the channels. At the receiving end the processes is reversed, with all the channels on a single fiber separated (demultiplexed), and demodulated optically and/or electrically.

Optical filters play important roles in handling these optical communications for the telecommunications industry. They perform wavelength multiplexing and demultiplexing of the 128 or more optical channels. They can also be used to gain scale EDFAs by flattening their gain profile. In certain configurations, they can also be used as optical interleavers. Interleavers are used to combine two or more streams of lower-channel-count, periodic signals into a single, high-channel-count signal stream with narrow channel spacing. De-interleavers are used to separate a single, incoming narrow-spaced, periodic optical signal stream with high channel count into two or more widely spaced periodic signal streams with low channel count. These interleavers have traditionally been available in two common designs.

The requirements for optical filters/interleavers used for any of these applications are very demanding. The close spacing between the channels in a WDM/interleaver makes it desirable to design a WDM with flat pass bands in order to increase the error tolerance. This is primarily because the center wavelength of a transmitter slips with temperature. Further, the cascading of the WDM stages causes the pass bands to become narrower at each WDM down the chain. Therefore, the larger the pass bands the greater the shift tolerance of the channel.

A common pure crystal interleaver design typically uses a birefringent crystal pair such as a $YVO_4$ and $LiNbO_3$ crystal combination to achieve the interleaving function with thermal compensation. Other crystal combinations, such as $TiO_2/YVO_4$, $TiO_2/LiNbO_3$, $YVO_4/PbMnO_4$, can also achieve thermal compensation and interleaving functions. $LiNbO_3$ is often a preferred choice of crystal since it is widely available and relatively inexpensive.

Unfortunately, the $LiNbO_3$ crystal has an inherent long-term stability problem probably because of its photorefractive and photoelastic properties. Its index of refraction will drift over time under environmental stress. The pure crystal design also suffers from $2^{nd}$ order effects, resulting in imperfect thermal compensation over a given temperature range. This problem arises from the fact that the thermal expansion coefficient and thermal optical coefficient (dn/dT) of most birefringent crystals is temperature dependent. Crystal pairs that are thermally compensated at room temperature or at any arbitrary temperature will not be thermally compensated at any different temperature. This leads to an undesirable amount of central wavelength (CWL) drift over the device operating temperature range, which is typically −5 to 70 deg C.

An alternate design for an interleaver uses polarizing beam splitters (PBS) made from a $BaK_1$ and $LaSF_3$ combination. The PBS controls the passage of light through the interleaver based upon the state of the polarization of the light. The PBS can also polarize light to a given state depending on the optical axis of the PBS.

The PBS design only uses optical glass. It will direct light to its respective path according to its polarization direction. Many of the PBS interleaver designs have much better thermal compensation properties since the thermal expansion coefficients and thermal optical coefficients of many types of optical glass used in these interleavers have much less temperature dependence. Most PBS types of interleavers do not suffer from the problem of CWL drift over operating temperature range as crystal interleavers do.

However, in some cases, for example, a 100 GHz interleaver, the PBS can be too large or small depending on the type of glass selected, leading to undesirable device size or aperture clipping. Moreover, many of the types of glass selected for proper device size are not well established, and therefore, expensive. The properties of such glass have not been scientifically established. Furthermore, the properties can be inconsistent from batch to batch, resulting in manufacturing difficulties. Thus, it is desirable to use an optical glass, which is well established in the industry, has a low cost, and is consistent in optical quality. Further, it is also desirable to use a well-known optical material to achieve thermal compensation while having easy to handle dimensions (a few mm in cross sections, small enough, yet easy to handle).

BRIEF SUMMARY OF THE INVENTION

The present invention provides optical filters that can be used in a range of telecommunications applications including optical multiplexers/demultiplexers, optical routers, and optical gain scalers. The optical filter is modular, using two or more couplers with a power of delay paths between each pair of couplers in a sequence to generate a range of optical filter functions. The desired filter profile/function is obtained by proper selection of the coupling ratio for each coupler and by the length of each pair of delay paths. The couplers may be implemented as polarization or intensity beam splitters positioned along the optical path.

Each coupler couples in controllable amounts, one or two inputs with the corresponding pair of delay paths. Where a coupler is implemented as a polarization beam splitter, the coupling is accomplished by the input to the coupler of polarized light and by the subsequent separation of orthogonal "P" and "S" components of that light onto corresponding ones of the pair of delay paths. The coupling ratio or percentage is determined, in the case of polarization beam splitter by the rotation of the polarization beam splitter with respect to the linearly polarized input. Where the coupler is implemented as an intensity beam splitter, the coupling is accomplished by input of light with the percentage of reflection and transmission of the light determining the coupling ratio of percentage of the light input onto corresponding ones of the pair of delay paths. The pair of delay paths may include passive thermal stabilization to allow the filter to function across a range of temperatures without substantial variation in its filter profile. The passive thermal stabilization of the filter(s) may be accomplished by a plurality of optical elements positioned in and defining the path length of each member of the pair of paths. These optical elements are designed so that the optical path length between the pair of paths remains substantially invariant across a range of temperatures.

Also provided is a hybrid cell that can function as an interleaver or de-interleaver, and which has better long-term stability, less material dispersion, and a smaller CWL drift over a temperature range than currently available pure crystal interleavers. Such a cell can also be used to modify a PBS type of interleaver to obtain dimensions that are easy to handle.

The present invention utilizes a PBS pair in conjunction with a wedge tuner and a birefringent crystal to achieve a more stable and more easily manufactured interleaver. A first PBS splits an incoming optical signal into two orthogonally polarized beams. A first beam passes through the first PBS along a first optical path that extends through the wedge tuner and a second PBS. The second beam follows a second optical path that circumvents the wedge tuner. This second beam passes through the first PBS, bypasses the wedge tuner, and enters the second PBS. This second PBS combines the first beam and the second beam. The combined beam or output beam then propagates through a birefringent crystal whose optical axis is oriented vertically with respect to the incoming beam.

These and other objects and features of the present invention will become more fully apparent from the following description and appended claims, or can be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 1C is an isometric view of an optical filter cell shown in FIG. 1A with one of the optical elements configured for adjustment of the center wavelength of the filter;

FIG. 1E is an isometric view of an optical filter cell shown in FIG. 1B with one of the optical elements configured for adjustment of the center wavelength of the filter and with an alternate coupler configuration;

FIG. 2D is a side elevation view of the variable coupling between cells of the multi-cell implementation shown in FIGS. 2A–B;

FIG. 2E shows the individual transforms associated with each of the four delay paths through the two cell sequence shown in FIG. 2A.

DETAILED DESCRIPTION OF THE EXEMPLARY EMBODIMENTS

Figure 1A:
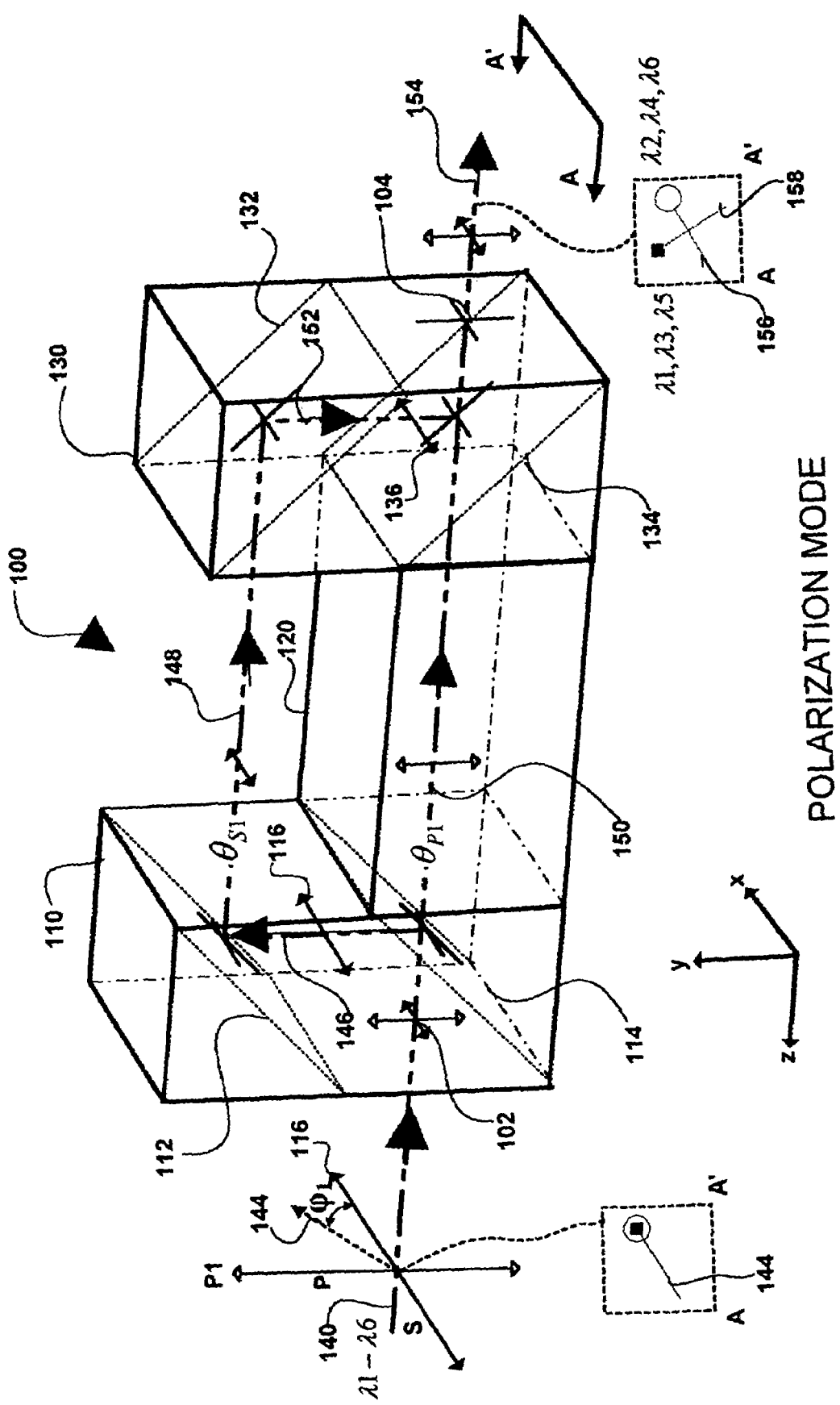
FIG. 1A is an isometric view of an optical filter cell with couplers employing polarization dependent beam splitting linked by a pair of delay paths.

FIG. 1A is an isometric view of an optical filter cell 100 with couplers employing polarization dependent beam splitting linked by a pair of delay paths 150 and 146, 148, 152. Each coupler transmits and reflects light depending on the input properties of the light. In the embodiment of the invention shown in FIG. 1A, each coupler is polarization sensitive and includes a "P" and "S" polarization axis orthogonal to one another.

A first coupler is positioned in the propagation path of incoming polarized light and transmits and reflects components of incoming polarized light aligned with the "P" and "S" polarization axes of the coupler respectively. Light transmitted and reflected by the coupler follows two distinct delay paths, one for transmitted light and the other for reflected light. Where incoming light is orthogonally polarized, the first coupler provides configurable amounts of coupling and cross-coupling of each of the orthogonal polarization vectors of the incoming light with either of the pair of delay paths. A second coupler positioned at a location where the two distinct delay paths intersect reverses the process and re-aligns light with orthogonal polarization vectors onto a common propagation axis.

The cell is shown within an "x, y, z" Cartesian coordinate system. The cell includes opposing optical glass blocks 110, 130, displaced from one another along the z axis with optical element 120 covering the span between the blocks. Optical glass block 110 is shown with a reflector 112 and a polarization dependent beam splitter 114 displaced from each other in a direction defined by the y axis. Optical glass block 130 is shown with a reflector 132 and a polarization dependent beam splitter 134 displaced from each other in a direction defined by the y axis.

The polarization dependent beam splitters have "S" polarization axes 116 and 136 respectively, which are aligned with one another and in the orientation of the cell that is shown, also aligned with the x axis. The "P" polarization axes of each polarization dependent beam splitter are orthogonal to the "S" axis. Polarized light input at first port 102 will couple with both the P and S axis of first coupler 114, a polarization beam splitter, in amounts that correspond with the relative angular rotation between the polarization vector(s) of the polarized input and the orthogonal P and S polarization axes of the beam splitter. The component of a polarized input that projects onto the S polarization axis of the beam splitter will be reflected by the beam splitter. The component of a polarized input, which projects onto the P polarization axis of the beam splitter, will be transmitted by the beam splitter. Between the couplers an optical element 120 is shown.

Each optical glass block 110, 130 can, in fact, be fabricated from two pairs of prisms. In the case of block 110, polarization dependent beam splitter 114 can be formed from a first pair of prisms at right or other complementary angles to one another, which are cemented together to minimize wave front distortion. The hypotenuse of the prisms is coated with a multi layer dielectric polarizing beam splitter coating. The prisms are then cemented together, to form a first rectangle, the exterior surfaces of which can be antireflection coated (AR) to minimize surface reflection losses.

A second pair of prisms can be used to form reflector 112. The hypotenuse of one of this second pair of prisms is coated with a reflective dielectric coating, and cemented to the hypotenuse of the other of the second pair of prisms. The hypotenuses of this second pair of prisms are then cemented together as well to form a second rectangle, the exterior surfaces of which can also be AR coated. The two rectangles formed by the two pairs of prisms can then be cemented to one another to form glass block 110. A similar technique can be used to fabricate second block 130.

The cell 100 couples light bi-directionally between a first port 102 and a second port 104 displaced from one another in a direction defined by the z axis. For purposes of illustration, polarized light 140 is shown entering cell 100 at first port 102 and exiting as a polarized output beam 154 at second port 104, though the propagation in the opposite direction is also supported.

The cell 100 is also highly directional so that light propagating in one direction is independent of the light propagating in the reverse direction. The polarized light beam 140 can be arbitrarily, circularly or linearly polarized. In the example shown, beam 140 is linearly polarized with a polarization vector 144 at an angle $\phi_1$ with respect to the "S" polarization axis 116 of the cell. As beam 140 enters cell 100, it is accepted onto either of two distinct P and S delay paths 150 and 146, 148, 152 respectively. These delay paths link polarization dependent beam splitters 114, 134. The amount of light that is coupled onto either delay path is determined by the angle $\phi_1$ of the incoming beam vector with respect to the S polarization axis of the cell.

In the example shown, light from polarization vector 144 in amounts proportional to sin ($\phi_1$) and cos ($\phi_1$) will couple to the P and S delay paths respectively. Rotation of the cell about the propagation path, e.g. the z axis, of beam 140 can be used to vary the coupling percentages or ratios between the incoming light and the P and S delay paths. Where incoming light includes orthogonal polarization vectors, the coupling of either vector will be determined by projecting that vector onto the P and S polarization axis of the polarization beam splitter. The polarization beam splitters 114, 134 thus serve as couplers that provide configurable amounts of coupling and cross-coupling of incoming beams with either of the pair of delay paths.

The amount of delay on the P and S delay paths are $\theta_{P1}$ and $\theta_{S1}$ respectively. The delay of each path is determined by its corresponding optical path length. The optical path length of each path is the sum of the product of physical dimension and the index of refraction of all the optical elements on each of the two distinct P and S delay paths 150 and 146, 148, 152 respectively. The delay difference for the cell is proportional to the difference in the optical path lengths between the P and S delay paths. The delay difference exhibits itself in the optical properties of the output beam 154.

That output beam exhibits the interference pattern produced by the re-coupling of the P and S delay paths by the second of the polarization beam splitters 134 into a single output beam. The output beam includes orthogonal polarization vectors 156–158. Each contains complementary periodic stop bands and pass bands of the other, with center wavelengths having a spacing between which is inversely related to the delay difference between the P and S delay paths. In other words, the larger the delay difference, the smaller the wavelength spacing which the optical filter cell can resolve. The first vector 156 contains pass bands with center wavelengths at even integer multiples of the periodic interval established by the delay difference. The second vector 158 contains pass bands with center wavelengths at odd integer multiples of the periodic interval established by the delay difference.

The cell 100 can be provided with an appropriate lens, e.g. a Gradient Index of Refraction Lens (GRIN), and a linear polarizer coupled to the first port to linearly polarize arbitrarily polarized incoming light and to direct it to the first port. At the opposite end, a beam displacer/combiner can be coupled with the second port to displace and combine orthogonally polarized odd and even channel components 156, 158, of an optical beam depending on the propagation direction of the light beam. An appropriate lens(es), e.g. (GRIN) can also be added at this end to focus and collimate the light from the beam displacer/combiner depending on the propagation direction. The resultant system can serve as either or both a multiplexer or a demultiplexer depending on a propagation direction of the light.

In an alternate embodiment of the invention there can be a single reflector replacing reflectors 112 and 130 to bend the S delay path between the two polarization beams splitters 114 and 134. In still another embodiment, additional reflectors can be added.

In another alternate embodiment of the invention, an opposing pair of back-to-back birefringent crystals can be used instead of the polarization beam splitters to split incoming light into an "e" and an "o" ray delay path corresponding with "S" and "P" delay paths respectively. The principal planes of the pair of crystals would be aligned in a common plane with the optical axis of each birefringent crystal at substantially complementary angles to one another so as to cause a splitting and recombining of the e and o ray delay paths.

Figure 1B:
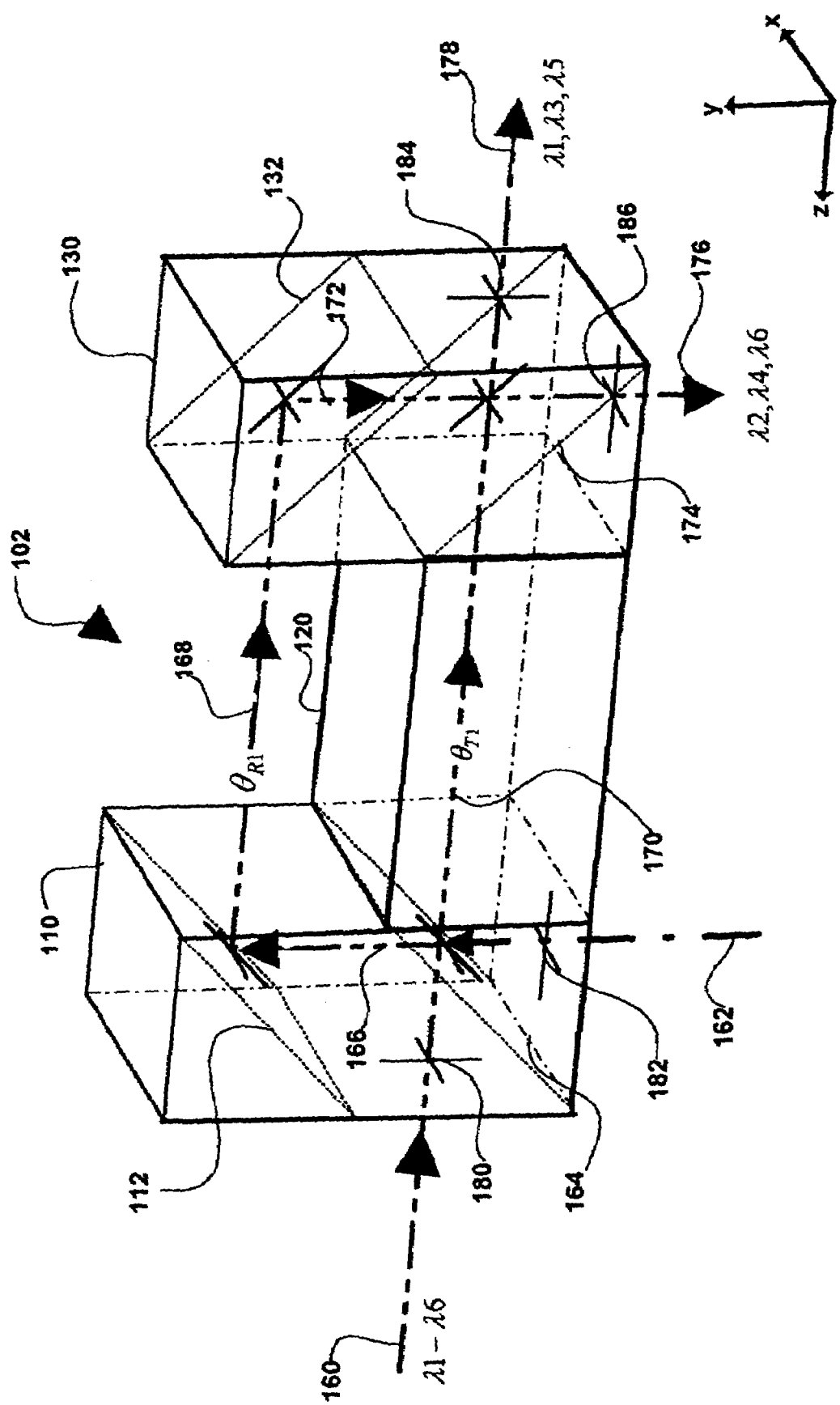
FIG. 1B is an isometric view of an optical filter cell with couplers employing intensity dependent beam splitting linked by a pair of delay paths.

FIG. 1B is an isometric view of an optical filter cell 102 with couplers employing intensity dependent beam splitting linked by a pair of delay paths 170 and 166, 168, 172. This cell is also shown within an "x, y, z" Cartesian coordinate system. The cell includes many of the features of the cell shown in FIG. 1A, with the exception that the coupling function is here performed by partial reflectors 164, 174, which form intensity beam splitters. The cell includes opposing optical glass blocks 110, 130 displaced from one another along the z axis, with optical element 120 covering the span between the blocks. Optical glass block 110 is shown with a reflector 112 and intensity beam splitter 164 displaced from each other in a direction defined by the y axis. Optical glass block 130 is shown with a reflector 132 and an intensity beam splitter 174 displaced from each other in a direction defined by the y axis. Between the couplers, an optical element 120 is shown.

Each optical glass block can in fact be fabricated from two pairs of prisms. In the case of block 110, intensity beam splitter 164 can be formed from a first pair of prisms at right or other complementary angles to one another, which are cemented together to minimize wave front distortion. The hypotenuse of one of the prisms is coated with a multi layer dielectric beam splitter coating which exhibits configurable amounts of transmission and reflection of an incident beam. The prisms are then cemented together, to form a first rectangle, the exterior surfaces of which can be antireflection coated (AR) to minimize surface reflection losses.

A second pair of prisms can be used to form reflector 112. The hypotenuse of one of this second pair of prisms is coated with a reflective dielectric coating, and cemented to the hypotenuse of the other of the second pair of prisms. The hypotenuses of this second pair of prisms are then cemented together as well to form a second rectangle, the exterior surfaces of which can also be AR coated. The two rectangles formed by the two pairs of prisms can then be cemented to one another to form glass block 110. A similar technique can be used to fabricate second block 130.

The cell 102 couples light bi-directionally between first and second ports 180, 182, and third and fourth ports 184, 186. For purposes of illustration, optical beams 160, 162 are shown entering the cell at first and second ports 180, 182 respectively, and exiting the cell as beams 178, 176 at third and fourth ports 184, 186 respectively. Propagation in the opposite direction is also supported. The cell is also highly directional so that light propagation in one direction is independent of the light propagating in the reverse direction.

In the example shown, beam 160 enters the cell at port 180 and beam 162 enters the cell at port 182. Each beam is accepted onto either of two distinct transmission ($T_1$) and reflection ($R_1$) delay paths 170 and 166, 168, 172 respectively. These delay paths link intensity beam splitters 164 and 174. The amount of light that is coupled from the inputs at ports 180 and 182 onto either delay path by each beam is determined by the beam path and the ratio or percentage of transmission and reflection of beam splitter 164.

The amount of light that is coupled from the either delay path to the output at ports 184 and 186 is determined by the beam path and the ratio or percentage of transmission and reflection of beam splitter 174. The percentage of transmission and reflection is an optical property that can be precisely specified. The intensity beam splitters 164, 174 thus serve as couplers that provide configurable amounts of coupling and cross-coupling of incoming beams with either of the pair of delay paths.

The amount of delay on the $T_1$ and $R_1$ delay paths 170 and 166, 168, 172 are $\theta_{T1}$ and $\theta_{R1}$ respectively. The delay of each path is determined by its corresponding optical path length. The optical path length of each path is the sum of the product of the physical dimension and the index of refraction of all the optical elements on each of the two distinct delay paths. The delay difference for the cell is proportional to the difference in the optical path lengths between the $R_1$ and $T_1$ delay paths.

The delay difference is illustrated in the optical properties of output beams 176, 178. The output beams exhibit an interference pattern produced by the re-coupling of the $R_1$ and $T_1$ delay paths by second beam splitter 174. Each output beam contains complementary periodic stop bands and pass bands of the other with center wavelengths the spacing between which is inversely related to the delay difference between the $R_1$ and $T_1$ delay paths. In other words the larger the delay difference the smaller the wavelength spacing which the optical filter cell can resolve. Output beam 176 contains pass bands with center wavelengths at even integer multiples of the periodic interval established by the delay difference. Output beam 178 contains pass bands with center wavelengths at odd integer multiples of the periodic interval established by the delay difference. The single cell 102 can serve as either or both a multiplexer or a demultiplexer depending on a propagation direction of the light.

For each of the optical filters discussed above it can be necessary to adjust the center wavelength of any given cell or set of delay paths. This can be accomplished by tilting of the cell about the x axis normal to the propagation path, or by tilting each of the components within the cell resulting a net change of effective optical path length difference. This will allow a shifting of the center wavelength of all of the pass bands generated by each cell or delay path.

FIG. 1C is an isometric view of the optical filter cell shown in FIG. 1A with one of the optical elements, i.e. element 120, configured for adjustment of the center wavelength of the filter. Optical element 120 is shown cleaved into a pair of complementary wedges 120A and 120B. As each wedge is moved in opposing directions along the x axis the optical path length of delay path 150 is altered. This results in a shift in the center wavelength of the cell. Once the cell exhibits the desired center wavelength the wedges 120A, 120B are fixed relative to blocks 120 and 130.

Figure 1D:
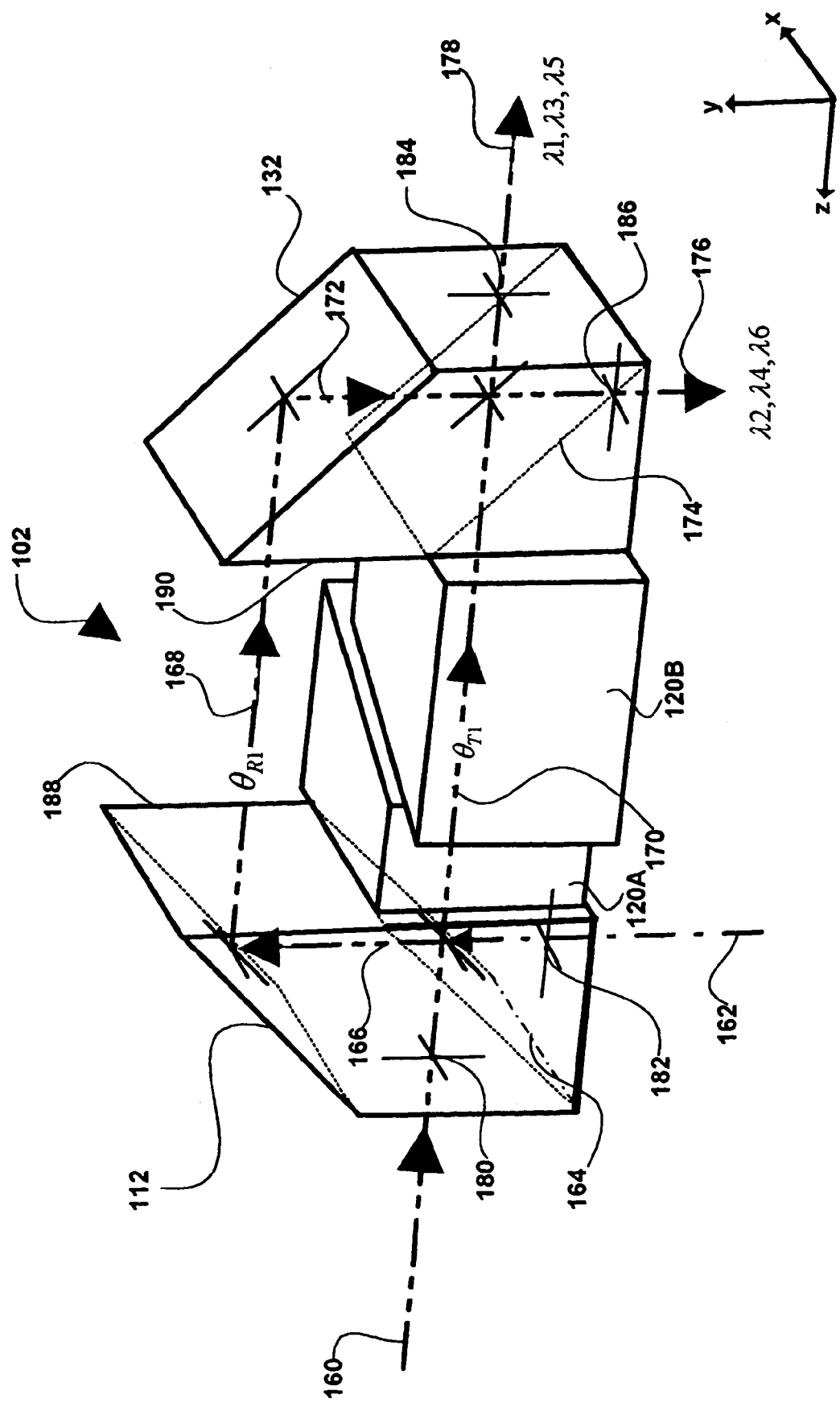
FIG. 1D is an isometric view of an optical filter cell shown in FIG. 1B with one of the optical elements configured for adjustment of the center wavelength of the filter and with an alternate coupler configuration.

FIG. 1D is an isometric view of the optical filter cell shown in FIG. 1B with one of the optical elements configured for adjustment of the center wavelength of the filter and with an alternate coupler configuration. As discussed above in connection with FIG. 1C, the cleaving of element 120 into wedges 120A and 120B provides a means for shifting the center wavelength of the cell.

FIG. 1D also introduces an alternate configuration for blocks 110 and 130 shown in FIGS. 1A–B. This alternate block configuration is shown in the context of intensity dependent beam splitting as introduced in FIG. 1B, and may be applied with equal advantage to the polarization dependent beam splitting shown in FIG. 1A. The couplers 164, 174 are defined on the corresponding external base faces of a pair of opposing blocks 188 and 190. Each block 188, 190 is configured with an upper angular portion on the corresponding external surfaces on which reflectors 112, 132 respectively, are defined.

FIG. 1E is an isometric view of the optical filter cell shown in FIG. 1B with one of the optical elements configured for adjustment of the center wavelength of the filter and with an alternate coupler configuration. As discussed above in connection with FIG. 1C, the cleaving of element 120 into wedges 102A and 120B provides a means for shifting the center wavelength of the cell.

FIG. 1E also introduces still another configuration for blocks 110 and 130 shown in FIGS. 1A–B. This alternate block configuration is also shown in the context of intensity dependent beam splitting as introduced in FIG. 1B, and may be applied with equal advantage to the polarization dependent beam splitting shown in FIG. 1A. In this embodiment of the invention, the block structure is dispensed with and each coupler 164, 174, is defined on its own discrete substrate. Suitable substrates include any suitable transparent medium, e.g. optical glass or a semi-conductor. Similarly, reflectors 112 and 132 are realized on their own discrete substrate, which in this case does not need to be transparent. Each coupler and reflector is positioned with respect to one another by a suitably stable frame, not shown.

Figures 2A, 2B:
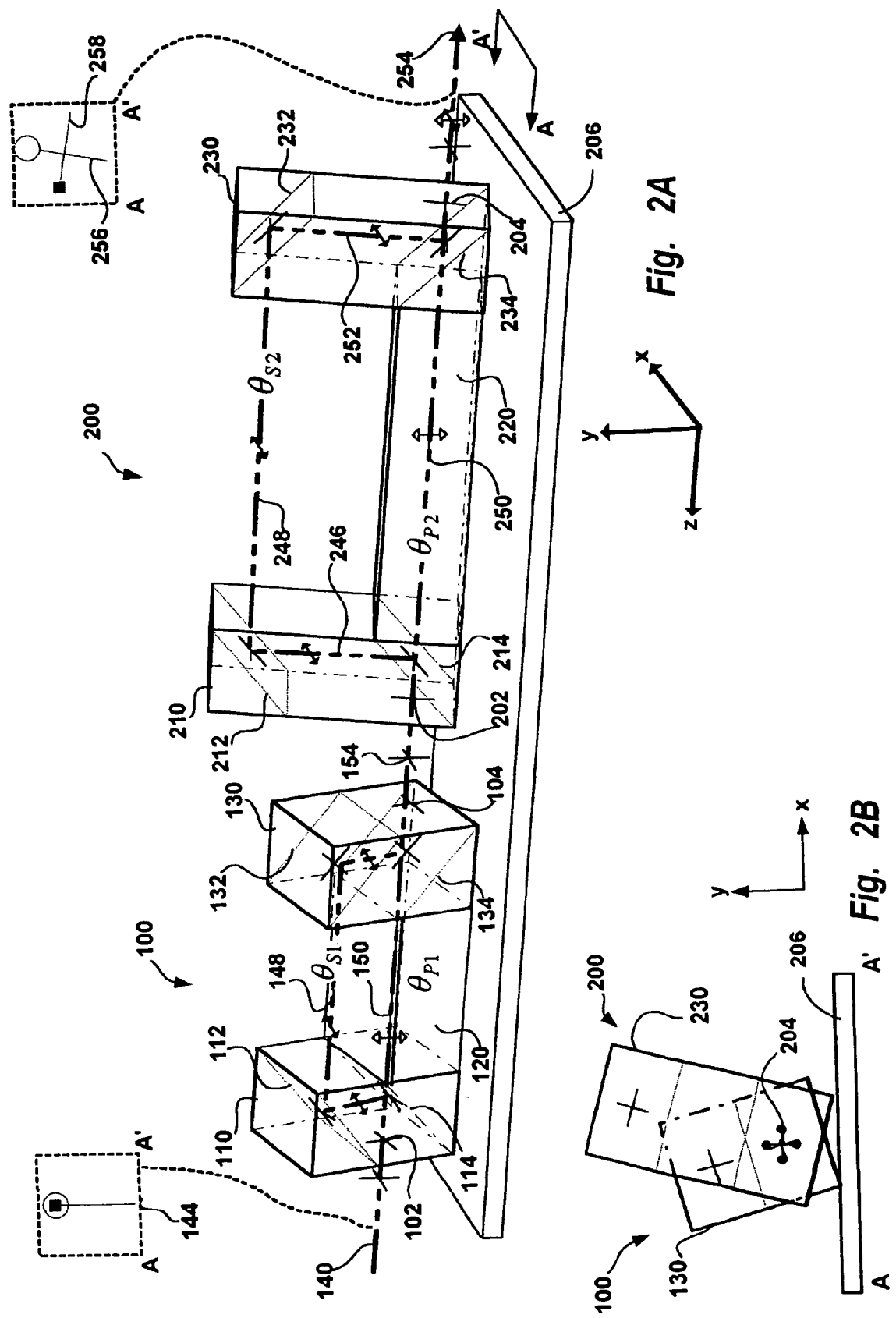
FIG. 2A–B are isometric and end views respectively of a multi-cell implementation of the optical filter cell shown in FIG. 1A.

FIGS. 2A–B are isometric and end views, respectively, of a multi-cell implementation of the optical filter cell shown in FIG. 1A. Two cells 100 and 200 are shown coupled serially to one another in sequence. This concept of serially coupling cells allows an optical filter to exhibit a more complex transfer function than the simple sinusoidal output provided by the single cell shown in FIG. 1A.

In this example, the delay paths provided by cell 200 and their delay difference, are larger than the delay paths and delay difference provided by cell 100. This result can be achieved either by fabricating cell 200 from the same optical elements as cell 100, with an increase in the physical length of the elements, or by fabricating cell 200 from optical elements with higher indices of refraction than those of cell 100, thus maintaining the same form factor for both cells.

The combination of the first cell and subsequent cells can be looked at as establishing, by the difference between their delay paths, the fundamental sinusoidal harmonic for the sequence and higher order harmonics. This objective can be achieved by designing one of the cells in the sequence with a Free Spectral Range (FSR) corresponding with the desired fundamental harmonic. Other cells can be designed with FSRs that are integer fractions of the base FSR. The coefficients or amplitude of each harmonic are provided by varying the coupling ratio/percentage/coefficients between a polarized input to a cell, and the P and S polarization axes of the cell, as provided by the corresponding polarization beam splitter. The coupling coefficients are varied by tilting of a cell about the propagation path of a polarized input to each cell.

Cell 100 includes the components described above in connection with FIG. 1A. Cell 200 includes couplers 214, 234 employing polarization dependent beam splitting, linked by a pair of delay paths 250 and 246, 248, 252. Cell 200 includes opposing optical glass blocks 210, 230 displaced from one another along the z axis with optical element 220 covering the span between the blocks. Optical glass block 210 is shown with a reflector 212 and a polarization dependent beam splitter 214 displaced from each other in a direction defined by the y axis. Optical glass block 230 is shown with a reflector 232 and a polarization dependent beam splitter 234 displaced from each other in a direction defined by the y axis. The polarization dependent beam splitters have "S" polarization axes that are aligned with one another. Between the couplers, an optical element 220 is shown. The various components are shown on top of base 206.

Polarized beam 140 has, in the example shown, a linearly polarized input with a vector 144. This beam enters cell 100 at first port 102, is reflected and transmitted by polarization beam splitter 114 onto one end of the pair of delay paths $\theta_{S2}$ and $\theta_{P2}$. At the opposite end of the delay paths, reflection and transmission by polarization beam splitter 234 produces a common output beam 254 that exits cell 200 at port 204. The process can be repeated to form a longer sequence of cells and a more complex optical filter transfer function.

Figure 2C:
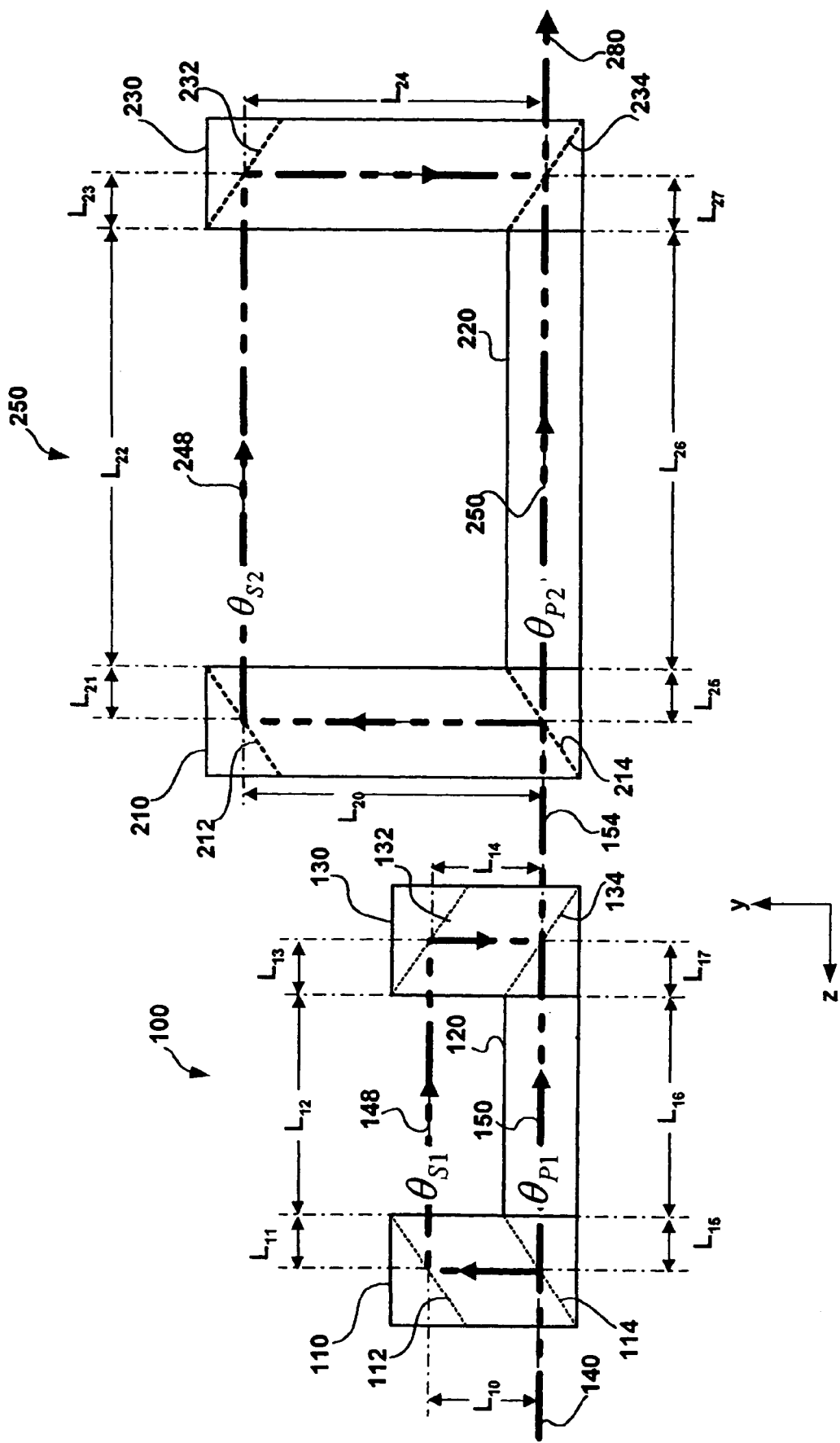
FIG. 2C is a side elevation view of the delay paths of the multi-cell implementation shown in FIGS. 2A–B.

FIG. 2C is a side elevation view of the delay paths of the multi-cell implementation shown in FIGS. 2A–B. The delay introduced into light passing along any delay path is a function of the optical path length of the optical elements that make up the delay path. Optical path length "L" of an optical element is expressed as the product of the physical distance "d" traversed by a beam propagating through the element multiplied by the index of refraction "n" of the element. Where multiple optical elements are involved, the individual contributions to the optical path length from the individual elements are summed.

For purposes of the current invention, optical elements include: a vacuum, a gas, a liquid, a solid or a plasma, along with the propagation paths. The index of refraction of a medium identifies the ratio of the speed of light in a vacuum to that of light in the medium. Where the optical path length varies as here between two delay paths, one path is said to be faster/slower than the other and there is said to be a delay difference between the two.

Beam 140 propagates through the first cell 100 across delay paths $\theta_{P1}$ and $\theta_{S1}$ and through the second cell 250 across delay paths $\theta_{P2}$ and $\theta_{S2}$. Delay path $\theta_{P1}$ includes optical elements defined by optical path length $L_{15}$–$L_{17}$. Delay path $v_{S1}$ includes optical elements defined by optical path lengths $L_{10}$–$L_{14}$. Delay path $\theta_{P2}$ includes optical elements defined by optical path length $L_{25}$–$L_{27}$. Delay path $\theta_{S2}$ includes optical elements defined by optical path length $L_{20}$–$L_{24}$. In the embodiment shown, the optical elements defined by optical path lengths $L_{12}$ and $L_{22}$ include air/gas/vacuum. The remaining optical elements can be fabricated from various types of optical glass including: BKx, fused silica, SFx, etc. By proper design of delay paths, the fundamental and higher order harmonics for the optical filter can be established.

The delay for the delay paths $\theta_{P1}$ and $\theta_{S1}$ in the first filter 100 are expressed as a function of the optical path lengths of each path in the following Equations 1 and 2 respectively.

$$\theta_{S1} = \left(2\pi \frac{v}{c}\right)\left(\sum_{i=1}^{i=l} d_i n_i\right) \quad (1)$$

-continued $$\theta_{PI} = \left(2\pi \frac{v}{c}\right)\left(\sum_{j=1}^{j=J} d_j n_j\right) \quad (2)$$

where c and v are the frequency and velocity of light in free space and where I and J are the number of optical elements that make up the delay paths with delays $\theta_{S1}$ and $\theta_{P1}$ respectively. For each of the I optical elements: vacuum, gas, plasma, liquid or solid which make up the delay path $\theta_{S1}$, the $i^{th}$ element has a physical length $d_i$ and an index of refraction $n_i$. For each of the J optical elements: vacuum, gas, plasma, liquid or solid which make up the delay path $\theta_{P1}$, the $j^{th}$ element has a physical length $d_j$ and an index of refraction $n_j$.

The delay difference between the two paths is expressed in Equation 3.

$$\theta_{S1} - \theta_{PI} = \left(2\pi \frac{v}{c}\right)\left(\sum_{i=1}^{i=I} d_i n_i - \left(\sum_{j=1}^{j=J} d_j n_j\right)\right) \quad (3)$$

The delay difference for the cell is proportional to the difference in the optical path lengths between the S and P delay paths. Similar considerations apply in determining the delays and delay differences for the pair of delay paths in second cell 200.

The optical path length difference between the two delay paths in a cell, corresponds inversely with the free spectral range (FSR) generated by the cell as evidenced in the orthogonal vector components of the output beam from the cell. This relationship is set forth in the following Equation 4.

$$FSR = \left(\frac{c}{|L_I - L_J|}\right) = \left(\frac{c}{\left|\sum_{i=1}^{i=I} d_i n_i - \sum_{j=1}^{j=J} d_j n_j\right|}\right) = 2\pi \frac{v}{(\theta_s - \theta_p)} \quad (4)$$

where $L_I$ and $L_J$ are the total optical path length of the I and J elements which make up the corresponding delay paths $\theta_{S1}$ and $\theta_{P1}$. For an optical mux/demux, the FSR should be a constant, perhaps equal to the channel spacing, e.g. 100 GHz. Using Equation 4, the delay difference required to generate this result can be determined, and from it a solution to the optical path lengths for each of the delay paths.

FIG. 2D is a side elevation view of the variable coupling between cells of the multi-cell implementation shown in FIGS. 2A–B. Coupling is used to control the amount of input polarized light that will be projected onto the S and P delay paths of a corresponding cell. Three coupling views 260, 262, and 264 are shown: at appropriate locations at the input to cell 100, the interface between cells 100 and 200 and at the output of cell 200, respectively. The three views 260–264 are from the output port 204 looking back along the propagation path of the input beam 140.

In the first of the coupling views 260, the polarized input is shown with a single input vector "I". The orthogonal polarization axes $P_1$, $S_1$ of first cell 100 are shown. The input, I, can include orthogonal input vectors. The amount of light that is coupled onto either delay path in the first cell is determined by the angle $\phi_1$ of the incoming beam vector with the S polarization axis of the cell. In the example shown a light from polarization vector 144 in amounts proportionate to sine ($\phi_1$) and cos ($\phi_1$) will couple to the P and S delay paths respectively. Rotation of the cell about the propagation path of the beam 140 can be used to vary the coupling percentages or ratios between the incoming light and the P and S delay paths.

In the next coupling view 262, light from the output port of cell 100 is coupled with the input port of cell 200. The orthogonal polarization vectors $P_1$, $S_1$ present in the output of the first cell are shown along with the orthogonal polarization vectors $P_2$, $S_2$, which are defined by the coupler of the next cell in the sequence, i.e. cell 200. The amount of light that is coupled onto either delay path in the second cell is determined by the angle $\phi_2$ between two sets of orthogonal vectors for the input and cell 200.

The last coupling view 264, shows both the orthogonal polarization vectors $P_2$, $S_2$ present in the output of the second cell, along with a second set of orthogonal polarization vectors $P_0$, $S_0$. This last orthogonal vector set is used to represent output optics used to separate the orthogonal vectors within the single output beam into two discrete beams (not shown). The amount of light coupled onto the output beams is defined by the angle $\phi_3$ between the two sets of orthogonal vectors.

FIG. 2E shows the individual transforms 288 associated with each of the four distinct delay paths from the input port 102 to the output port 204. The number of discrete paths in a multi-cell sequence of N cells with two delay paths between each equals $2^N$. For two cells there are $2^2$ or 4 discrete paths between an input and an output. The first of these paths is along delay paths $\theta_{S1}$ and $\theta_{S2}$ in the first cell 100 and the second cell 200 respectively. The second of these paths is along delay paths $\theta_{S1}$ and $\theta_{P2}$.

The transfer function for the optical filter in single or sequential cell embodiments is the sum of the individual transfer functions associated with each discrete path from input to output. Transfer functions 288, 290, 292, 294 are shown for the $1^{st}$ to $4^{th}$ paths discussed above, respectively. Each transfer function includes two terms 296, 298. First term 296 corresponds to a coefficient in a Fourier series with the magnitude of the coefficient being proportional to the product of the coupling or cross coupling coefficients along the particular path. Second term 298 corresponds to the frequency component associated with that coefficient. The frequency component corresponds with the sum of the delays along a corresponding path. This in turn corresponds with the optical path lengths along each path. The sum of all the transfer functions forms a truncated Fourier series that fully defines the optical filter.

In an exemplary embodiment of the invention, a multi-cell design includes a first cell of 100 GHz FSR and a $2^{nd}$ cell of 50 GHz FSR, which can be used to form a polarization type square top comb filter. This filter can split an optical stream with 50 GHz channel spacing into two separate optical streams with odd and even 100 GHz channel spacing respectively. Alternately, this filter can combine two optical streams with 50 GHz channel spacing. The $1^{st}$ angle $\phi_1$ can be substantially equal to 45 degrees and $2^{nd}$ angle $\phi_2$ can substantially equal to (45+22.5) degrees.

Similarly, a first cell of 100 GHz FSR and $2^{nd}$ cell of 50 GHz FSR can be used to form an intensity type square top comb filter. The $1^{st}$ splitting ratio is substantially equal to 50/50%. The $2^{nd}$ splitting ratio equals $Cos^2(45+22.5°)/Sin^2(45+22.5°)$.

In still another exemplary embodiment of the invention, a first stage with a plurality of cells and a second stage with a plurality of cells can be coupled together to further clean up the signal. In a multi-cell embodiment, a square top filter function can be achieved by choosing one cell with the base FSR, with the FSRs of the remaining cells standing in relation to the FSR of the base cell as integer fractional multiples thereof.

Further teachings on sequentially coupled optical filter cells can be found in either of the two following references. See S. E. Harris et al., *Optical Network Synthesis Using Birefringent Crystals*, JOURNAL OF THE OPTICAL SOCIETY OF AMERICA, VOLUME 54, Number 10, October 1964 for a general discussion of transfer functions related to birefringent crystals, which is hereby incorporated by references as if fully set forth herein. See C. H. Henry et al. U.S. Pat. No. 5,596,661 entitled *"Monolithic Optical Waveguide Filters based on Fourier Expansion"* issued on Jan. 31, 1997 for a general discussion of transfer functions related to waveguides, which is hereby incorporated by reference as if fully set forth herein.

Passive Thermal Stabilization

The typical application of optical filters constructed using the above techniques is an optical mux/demux. In order for that device to function properly, it must create the desired stop bands and pass bands for the odd and even channels that it separates. For current telecommunication applications, the filter would be designed with a constant FSR, perhaps equal to the channel spacing, e.g. 100 GHz. Other channel spacing can be used, while the present invention providing the desired capabilities. For instance, channel spacing, and so an FSR, of about 25 GHz is possible. More generally, channel spacing, and so an FSR, of greater than 25 GHz, greater or lesser than 50 GHz, and greater or lesser than 100 GHz is possible.

An optical filter with 100 GHz FSR would generate the required stop bands and pass bands in each of the orthogonal polarization vectors present on the output. One of the orthogonal output vectors would contain the pass bands associated with the center wavelengths of the odd channels. The other of the orthogonal output vectors would contain the pass bands associated with the center wavelengths of the even channels.

Temperature variations in a mux/demux that can affect the performance can result from the environment or from the power transmitted through the device. This can result in the periodic odd and even pass bands generated by the optical filter moving out of alignment with selected grid, e.g., the ITU grid. This is primarily because the center wavelength of a pass band slips with temperature. This misalignment results in attenuation of signal strength, cross talk and ultimately loss of transmission/reception capability until the optical filter returns to its original temperature. In practice therefore, the optical filters and devices fabricated therefrom must be thermally stable across a range of temperatures.

One solution is to flatten the pass bands of the filter. Multi cell filter designs such as those discussed above allow the pass bands to exhibit higher order harmonics in the form of non-sinusoidal pass band profiles, a.k.a. "flat tops" (See FIG. 4). The close spacing between the channels in a WDM, makes it desirable to design a WDM with flat pass bands in order to increase the error tolerance to temperature induced shifts in the pass bands. Even with flat top filter profiles, temperature stabilization is still required due to the precise telecommunication channel spacing.

Another solution is to actively stabilize the temperature of the multiplexer/demultiplexer using a heater or cooler and a closed loop feedback of temperature or wavelength. This solution can be expensive and can increase the form factor of the mux/demux. Nevertheless, the current invention may be practiced with active temperature stabilization. A possible benefit to active temperature stabilization is that the optical elements that make up each pair of delay paths can all be fabricated from a common medium with identical indices of refraction and thermal expansion coefficients.

Although capable of being utilized in systems with active temperature stabilization, the current invention is capable of providing temperature stability for the optical filters without active temperature control where appropriate. This greatly enhances the precision of the devices or systems fabricated therefrom, and reduce system cost. The current invention is capable of providing passive temperature stabilization of an optical device, through proper selection and design of the optical elements which form each pair of delay paths, so that the delay difference for each pair of delay paths and hence the system as a whole, remain constant.

Since the delay difference is directly related to the difference in the optical path lengths, this invention provides thermal stabilization of the delay difference. As opposed to prior art designs that use a single medium for each pair of delay paths, the current invention provides at least one of the delay paths with two optical elements each of which exhibits a different optical path length response to temperature. Typically, this takes the form of optical elements with different thermal optic coefficients.

The system is designed so that $d(L_I-L_J)/dT$ equals substantially zero. This latter condition is satisfied when the derivative of the denominator in Equation 4 substantially equals zero as set forth in the following Equation 5:

$$\frac{d(L_I - L_J)}{dT} = \frac{d\left(\sum_{i=1}^{i=I} d_i n_i - \sum_{j=1}^{j=J} d_j n_j\right)}{dT} \quad (5)$$

$$= \sum_{i=1}^{i=I} (d_i \beta_i + a_i n_i d_i) - \sum_{j=1}^{j=J} (d_j \beta_j + a_j n_j d_j) \approx 0$$

where $\alpha_i$ and $\alpha_j$ are the thermal expansion coefficients for each optical element that form the S and P delay paths, respectively, in each cell, and where $\beta_i$ and $\beta_j$ are the thermal optic coefficients for the temperature induced change in the refractive index for each element in the S and P delay paths, respectively.

The following Table 1 shows various relevant optical parameters for some optical mediums that can be used to fabricate the optical elements that make up each pair of delay paths.

TABLE 1

| | @1550 nm | Vacuum | Air | BK7 | SF5 | Fused Silica | BaK1 | LaSFN3 0 |
|---|---|---|---|---|---|---|---|---|
| 2 | n | 1 | 1.00027 | 1.50066 | 1.64329 | 1.44409 | 1.55517 | 1.77448 |
| 3 | $\beta = \frac{dn}{dT} \times 10^{-6}$ | 0 | 0* | 0.907465 | 1.407 | 13.7 | 0.066 | 2.293 |
| 4 | $\alpha \times 10^{-6}$ | 0 | 0* | 5.1 | 8.2 | 0.52 | 7.6 | 6.2 |

*assuming constant volume

For each material, its refractive index at 1550 nm is set forth in row 2 respectively. The change in refractive index, n, as a function of temperature β, is set forth in row 3. Row 7 sets forth the coefficient of thermal expansion, α, for the medium.

The selection of physical length of each optical component can be determined by solving Equations 4 and 5 together. For example, for cell 100, first coupler 100, second coupler 130 and spacer 150 can be made of fused silica. The first beam splitting surface of prism 110 forms a 35 degree angle with respect to the bottom surface of the coupler. For a 100 GHz FSR and thermally compensated cell, L16=2.862 mm and its width in FIG. 2C is 3.014 mm. The spacer length, L10, is 1.8475 mm. Second coupler 130 is identical to first coupler 110.

Figure 3A:
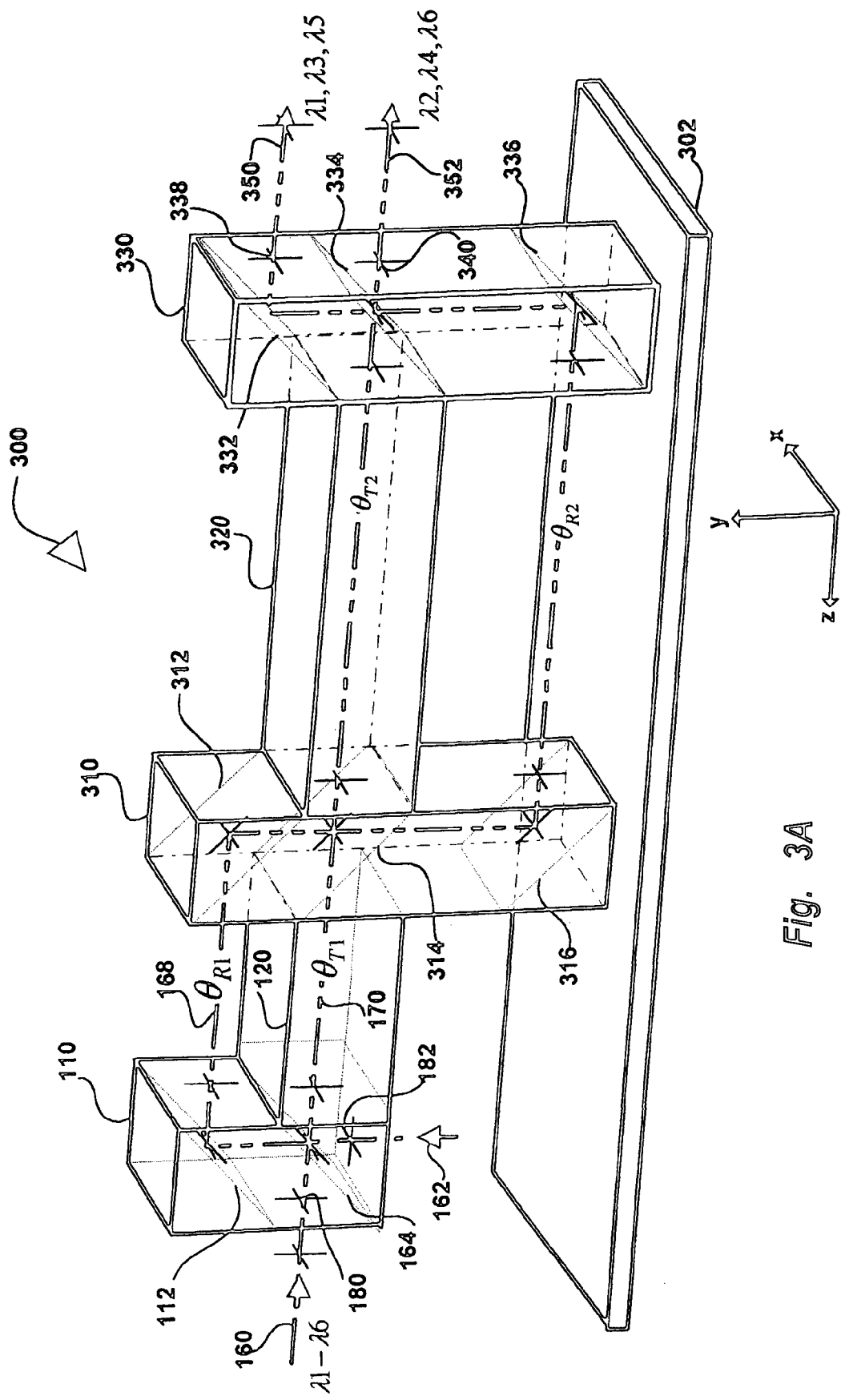
FIG. 3A is an isometric side view of an optical filter constructed from a series of delay paths coupled by intensity dependent beam splitters.

FIG. 3A is an isometric side view of an optical filter constructed from a series of delay paths coupled by intensity dependent beam splitters. Such a filter could be fabricated strictly by repetition of the cell structure shown in FIG. 1B. In this embodiment of the invention however, intermediate couplers are configured in a single coupling block with a pair of reflectors. Each intermediate coupling block couples an adjacent pair of delay paths.

Three coupler/reflector blocks 110, 310, 330 are shown with a first delay path pair $\theta_{R1}$, $\theta_{T1}$ and a second delay path pair $\theta_{R2}$, $\theta_{T2}$, between them to form a sequence of delay paths. The sequence of delay paths allows, as discussed above, an optional filter to exhibit a more complex transfer function than the simple sinusoidal output provided by the single cell shown in FIG. 1B. The second pair of delay paths $\theta_{R2}$, $\theta_{T2}$ is shown with a delay difference larger than the first pair of delay paths. For purposes of example, the physical dimension of the second pair of delay paths is larger than the first pair.

If the indices of refraction of the optical elements of the second set of delay paths are increased, the physical dimension required to generate the larger delay difference will decrease. The first delay path pair can establish, by the difference between its delay paths, the fundamental sinusoidal harmonic for the sequence, with the second delay path pair providing higher order harmonics. The coefficients or amplitude of each harmonic are provided by varying the coupling ratio/percentage/coefficients between the reflection and transmission delay paths within each delay path pair. The coupling coefficients are varied by varying the reflection and transmission ratios for each intensity beam splitter 164, 314 and 334 within the sequence.

The first coupler block includes intensity beam splitter 164 and reflector 112. The intensity beam splitter 164 accepts input from either or both of beams 160, 162 at the first and second ports 180, 182, respectively. Optical element 120 bridges the gap between coupler/reflector block 110 and the next coupler/reflector block 310 in the sequence. Coupler/reflector block 310 includes intensity beam splitter 314 and reflectors 312, 316.

The intensity beam splitter couples the inputs/outputs from the first pair of delay paths $\theta_{R1}$, $\theta_{T1}$ to the outputs/inputs of the second delay path pair $\theta_{R2}$, $\theta_{T2}$. The reflectors 312, 316 handle the redirection of the delay paths $\theta_{R1}$, $\theta_{R2}$ respectively. Optical element 320 bridges the gap between coupler/reflector block 310 and the next coupler/reflector block 330 in the sequence. Coupler/reflector block 330 includes intensity beam splitter 334 and reflectors 332, 336. The intensity beam splitter couples the inputs/outputs from the second pair of delay paths $\theta_{R2}$, $\theta_{T2}$ to the third and fourth ports 338, 340, respectively. Reflector 336 handles the redirection of the delay path $\theta_{R2}$. Each coupler reflector block can be fabricated from optical glass in the same manner discussed above in connection with FIG. 1B. The various components are shown on top of base 302.

Optical beams 160, 162, input at ports 180, 182 respectively, traverse the sequence of delay paths to exit as two discrete optical beams 350, 352 at ports 338, 340 respectively. The basic structure shown here can be continued to form a longer sequence of cells and a more complex optical filter transfer function.

Figure 3B:
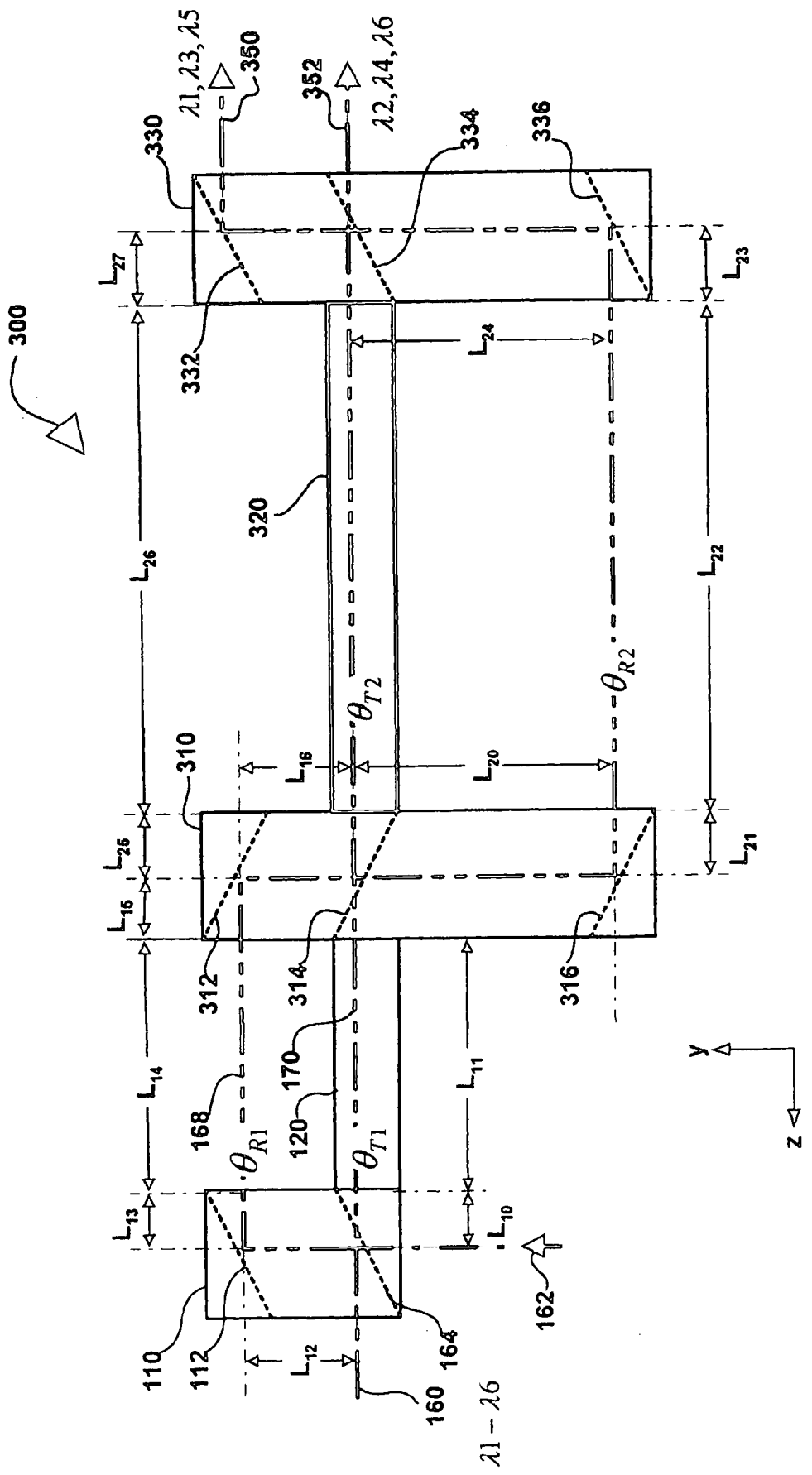
FIG. 3B is a side elevation view of the delay paths of the multi-cell implementation shown in FIG. 3A.

FIG. 3B is a side elevation view of the delay paths of the multi-cell implementation shown in FIG. 3A. The delay introduced into light passing along any delay path is a function of the optical path length of the various optical elements on the delay path. For purposes of the current invention optical elements include: a vacuum, a gas, a liquid, a solid or a plasma along the propagation path.

Beams 160, 162 propagate through the first pair of delay paths $\theta_{R1}$, $\theta_{T1}$ and the second pair of delay paths $\theta_{R2}$, $\theta_{T2}$. Delay path $\theta_{T1}$ includes optical elements defined by optical path length $L_{10}$–$L_{11}$ and $L_{15}$. Delay path $\theta_{R1}$ includes optical elements defined by optical path lengths $L_{12}$–$L_{16}$. Delay path $\theta_{T2}$ includes optical elements defined by optical path lengths $L_{25}$–$L_{27}$. Delay path $\theta_{R2}$ includes optical elements defined by optical path lengths $L_{20}$–$L_{24}$. In the embodiment shown the optical elements defined by optical path lengths $L_{14}$ and $L_{22}$ include air/gas/vacuum. The remaining optical elements can be fabricated from various types of optical glass including: BK7, fused silica, SF5. By proper design of delay paths, the fundamental and higher order harmonics for the optical filter can be established.

The delay for the delay paths $\theta_{R1}$ and $\theta_{T1}$ are expressed as a function of the optical path lengths of each path as discussed above in Equations 1 and 2, with $\theta_{R1}$ substituted for $\theta_{S1}$ in Equation 1 and with $\theta_{T1}$ substituted for $\theta_{P1}$, respectively. The delay difference between the two delay paths is calculated in the same manner as shown in Equation 3 above. The delay difference for the cell is proportional to the difference in the optical path lengths between the reflection (R) and transmission (T) delay paths. Similar considerations apply in determining the delays and delay differences for the second pair of delay paths $\theta_{R2}$ and $\theta_{T2}$.

The optical path length difference between the two delay paths in a delay path pair corresponds inversely with the free spectral range (FSR) of the cell as evidenced in the pass bands and stop bands in output beams 350, 352 from the cell. This relationship is set forth and discussed in Equation 4 above with $L_I$ and $L_J$ representing, in this embodiment, the total optical path length of the I and J elements which make up the corresponding delay paths $\theta_{R1}$ and $\theta_{T1}$. For an optical mux/demux, a condition to be satisfied is that the FSR be a constant, perhaps equal to the channel spacing, e.g. 100 GHz. Using Equation 4 the delay difference required to generate this result can be determined, and from it a solution to the optical path lengths for each of the delay paths.

Figure 3C:
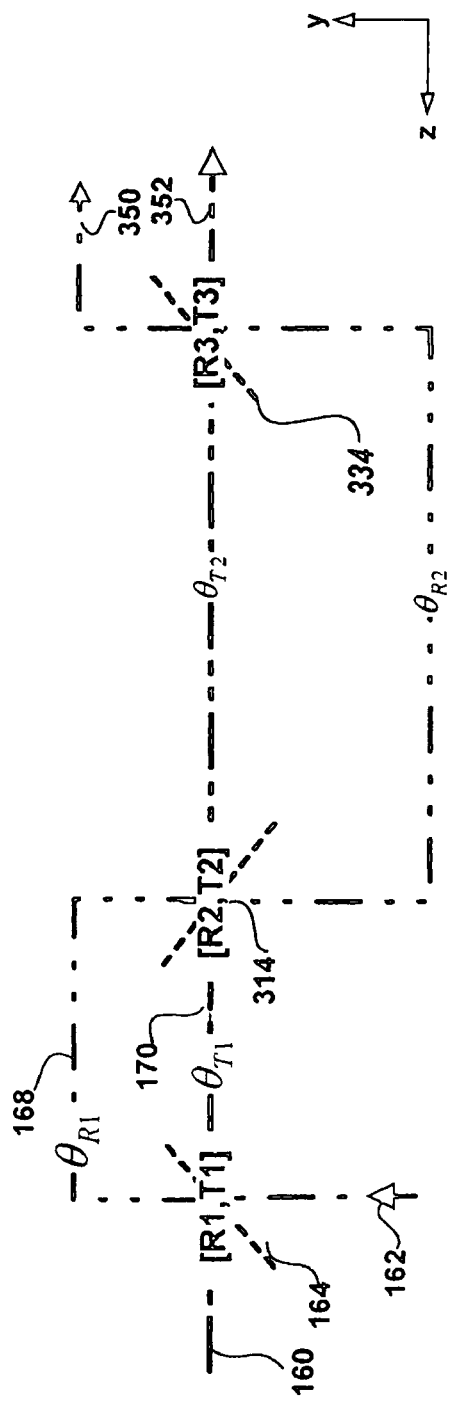
FIG. 3C is a side elevation view of the variable coupling between cells of the multi-cell implementation shown in FIG. 3A.

FIG. 3C is a side elevation view of the variable coupling between cells of the multi-cell implementation shown in FIG. 3A. Coupling is used to control the amount an input of polarized light that will be projected onto the R and T delay paths. The coupling values for the intensity beam splitters 164, 314, and 334 are, and respectively.

Figure 3D:
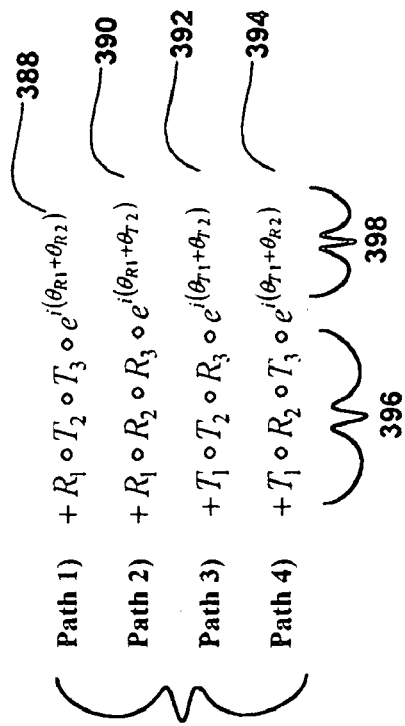
FIG. 3D shows the individual transforms associated with each of the optical paths shown in FIG. 3A.

FIG. 3D shows the individual transforms associated with each of the optical paths for input beam 160 from input port 180 (See FIG. 3A), to output port 350. The number of discrete paths in a multi-cell sequence of N cells with two delay paths in each delay path pair, equals $2^N$, as discussed above in connection with FIGS. 2D–E. For the embodiment shown in FIGS. 3A–C, with two pairs of delay paths there are $2^2$ or 4 discrete paths between any one of the two ports serving as inputs and any one of the two output ports serving as output.

Dealing with beam 160 as an input at the first port 180 (See FIG. 3A) and beam 350 as an output at port 338 (See FIG. 3A) there are 4 discrete delay paths from input to output. These paths are $\theta_{R1} > \theta_{R2}$, $\theta_{R1} > \theta_{T2}$, $\theta_{T1} > \theta_{T2}$, and $\theta_{T1} > \theta_{R2}$. The transfer function for the optical filter in single or sequential cell embodiments between any input and output port is the sum of the individual transfer functions associated with each discrete path from input to output. Transfer functions 388, 390, 392, 394 are shown for the $1^{st}$ to $4^{th}$ paths discussed above.

Each transfer function includes two terms 396, 398. First term 396 corresponds to a coefficient in a Fourier series with the coefficient magnitude proportional to the product of the coupling or cross coupling coefficients along the particular path. Second term 398 corresponds to the frequency component associated with that coefficient. The frequency component corresponds with the sum of the delays along a corresponding path. This in turn corresponds with the optical path lengths along each path. The sum of all the transfer functions forms a truncated Fourier series, which fully defines the optical filter. Thermal stabilization of the delay pairs is effected in this embodiment of the invention in the same manner as discussed above in connection with Equation 5, for all the optical elements that make up each of the delay paths.

Figure 4:
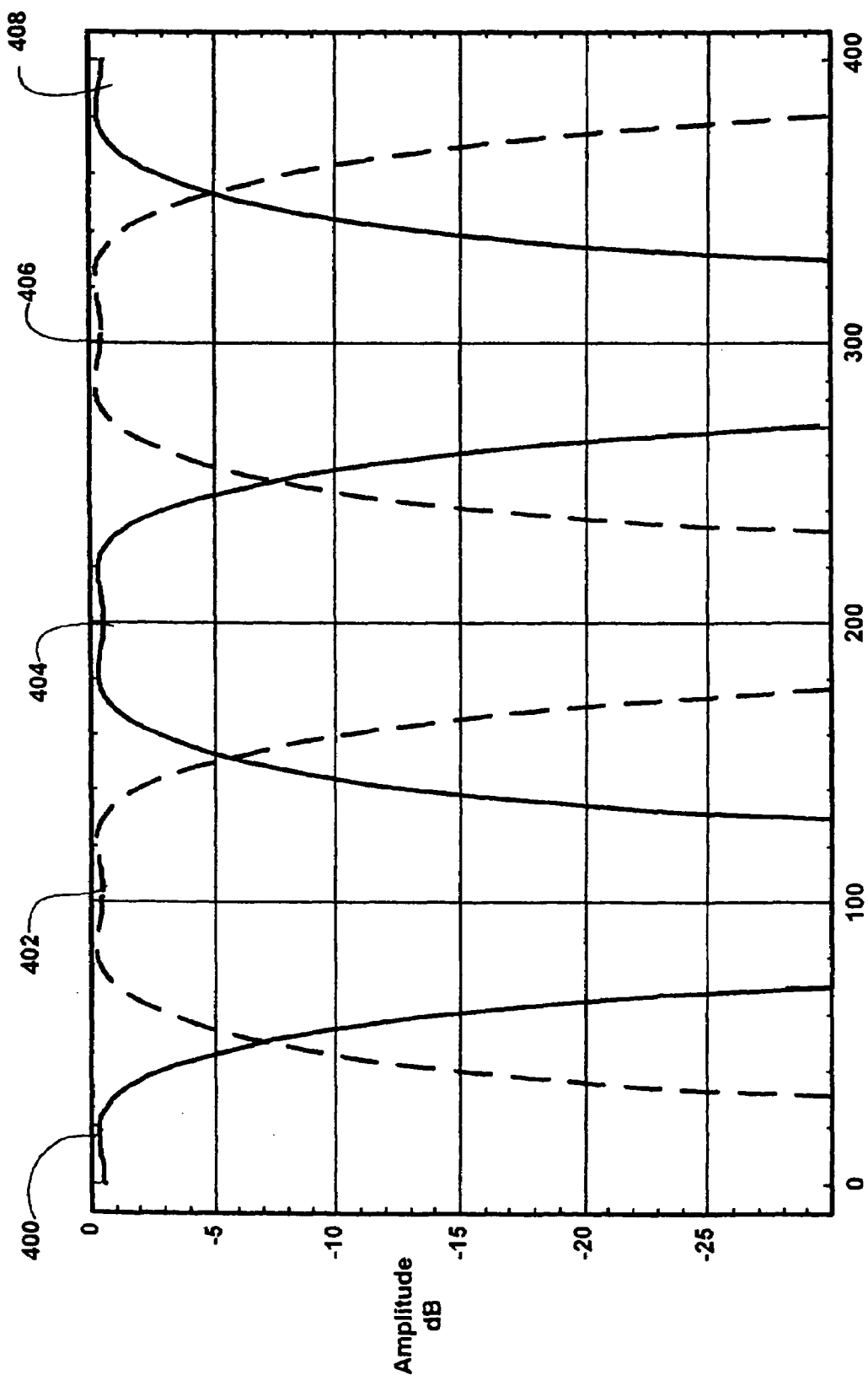
FIG. 4 is a graph showing the pass bands and stop bands associated with a specific filter transform, which can be achieved using the optical filters of the current invention.

FIG. 4 is a graph showing the pass bands and stop bands associated with a specific filter transform, which can be achieved using the optical filters of the current invention. In the example shown the envelope associated with six narrowly spaced, i.e., 100 GHz or 0.8 nm WDM channels. The odd channels 400, 404, 408 are shown in solid lines. The even channels 402, 406 are shown in dashed lines. The precise center frequencies of each channel are specified by standard setting organizations such as the International Telecommunications Union (ITU). These center frequencies are set forth as part of a wavelength grid that defines the center frequencies and spacing between channels.

The pass bands exhibit flat tops which may be preferred because each channel is subject to shifting around the center frequency and a flat top avoids attenuation of a channel subject to such shifting. Shifting can be caused by any one of a number of factors including temperature, inter-channel interference and polarization mode dispersion. The flat top profile is achieved by the sequencing of optical filters as shown in either of FIG. 2A or 3A, to provide higher order harmonics.

In alternate embodiments of the invention, the cells and serially coupled cells can be fabricated on a common semi-conductor substrate. The various components: reflectors, couplers, and optical elements can be fabricated using a combination of etching and deposition techniques well known in the semi-conductor industry.

Figure 5:
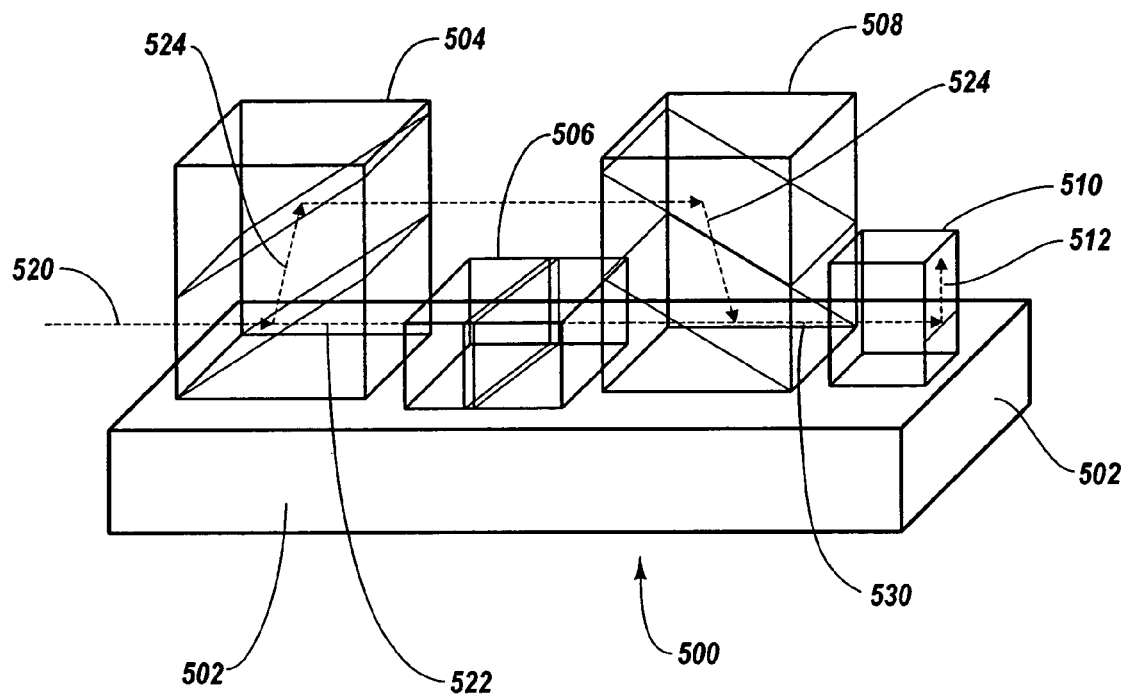
FIG. 5 illustrates a perspective view of a hybrid cell according to one aspect of the present invention.
Figure 6:
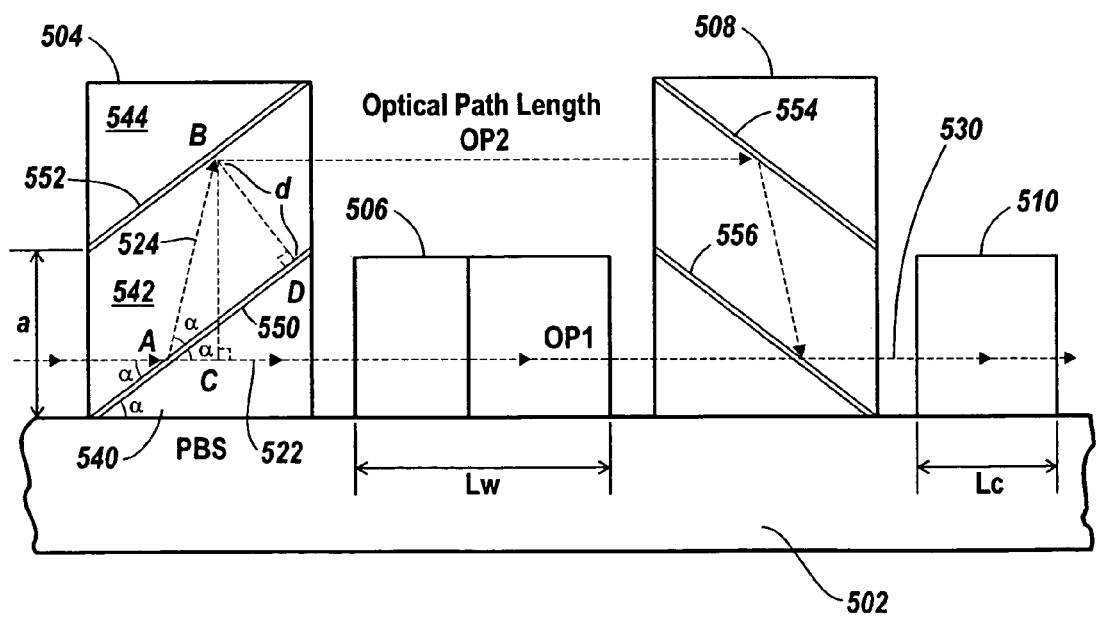
FIG. 6 illustrates a side view showing various distances and variables used in calculating desired lengths of a wedge tuner and birefringent crystal of the hybrid cell of FIG. 5 according to one aspect of the present invention.
Figure 2C:
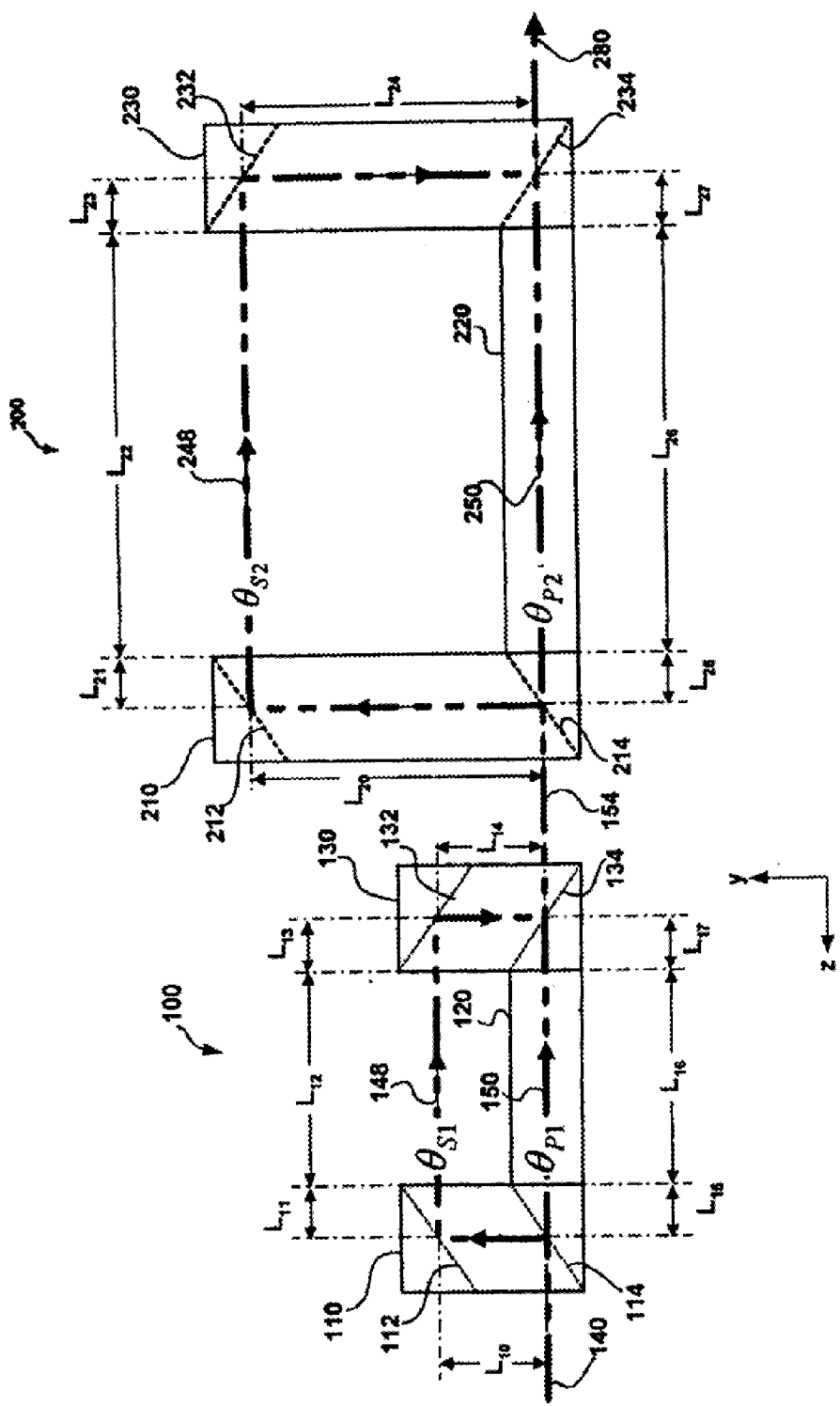

Another alternate embodiment of the present invention is disclosed in FIGS. 5 and 6, showing a hybrid cell 500. Air gaps shown between the components of hybrid cell 500 are for the sake of clarity; with it being understood by one skilled in, the art that the optical components of the hybrid cell can also be in contact one with another. While air gaps between the components would change the calculations outlined below, a functional device according to the invention can be made with air gaps between components. Such a device, including air gaps, is fully contemplated to be within the scope of this application.

As shown in FIGS. 5 and 6, hybrid cell 500 has a base 502 that functions as the support structure for the optical components that make up hybrid cell 500. Base 502 can be constructed from any suitable material providing sufficient structural rigidity for the optical components. Such materials might include glass, ceramics, plastics and metals. A choice is often a material that is the same as the material of the PBS or a material which has a substantially similar thermal expansion coefficient as that of the PBS to minimize stress.

Mounted on base 502 is a first polarizing beam splitter (PBS) 504. The PBS 504 separates an input beam into two individual beams based upon polarization states. For instance, PBS 504 separates the input beam into a $1^{st}$ beam and a 2nd beam having polarization states orthogonal one to another. These beams propagate through PBS 504 following different paths, as will be described in more detail hereinafter. PBS 504 can have a similar configuration to the other PBSs described herein.

As illustrated in FIG. 6, first PBS 504 is shown with two interfaces 550 and 552 between the three optical components forming first PBS 504; component 540, component 542, and component 544. Alternatively, pairs of prisms or optical components that are stacked together to form a PBS, as described in relation to blocks 110 and 130 of FIG. 1A, can form PBS 504.

With continued reference to FIG. 6, the angular orientation of interface 550 relative to base 502 or a bottom portion of first PBS 504 is angle α. Angle α is typically between 35 and 45 degrees, however, other angles are possible. Generally, angle α can range from about 20 to about 50 degrees. Distance d, represented by line BD, is the thickness of component 542 of PBS 504.

Optically coupled with first PBS 504 is a wedge tuner 506. Wedge tuner 506 includes two optical wedges that can be moved relative one to another to vary the physical length and optical path length of wedge tuner 506, as discussed previously with reference to component 120 in FIGS. 1C–1E. By varying the lengths of wedge tuner 506, a change occurs in the delay between first beam 522 and second beam 524 propagating through hybrid cell 500. Varying the delay varies the optical characteristics of hybrid cell 500 so that the difference between in optical path distance for first beam 522 and second beam 524 is equal to the free spectral range. This will be discussed in more detail hereinafter with respect to calculating various lengths and optical characteristics of hybrid cell 500 to achieve a desired optical path distance that is equal to the free spectral range.

Various configurations of wedge tuner 506 are possible. For instance, one can replace wedge tuner 506 with a rectangular optical glass block. By tilting the optical glass block, a small phase delay can be introduced. Different sizes of glass blocks can be used in combination to tune an optical signal to have a wider range of optical delays. Wedge tuner 506 can be made from various materials, including, but not limited to, optical glass such as quartz, fused silica, BK7, BaK1, SF10, etc.

Hybrid cell 500 further includes a second PBS 508 that optically couples with wedge tuner 506 and a birefringent crystal 510. The PBS 508 has a similar configuration to PBS 504. However, instead of separating a single beam into two beams, as is performed by PBS 504, PBS 508 combines first beam 522 and second beam 524 into an output beam 530 that propagates through crystal 510.

The crystal 510 has an optical axis 512 approximately vertical with respect to base 502. Crystal 510 aids with combining first beam 522 and second beam 524 due to its birefringent characteristics. Crystal 510 can be an Yttrium Orthovanadate (YVO4) crystal, Calcite (CaCO$_3$) crystal, a rutile (TiO$_2$) crystal, alpha-BBO, or any other birefringent material.

In operation, a beam 520 input into first PBS 504 is split into two orthogonally polarized beams, first beam 522 and second beam 524, at point A, i.e., upon beam 520 being incident upon interface 550. First beam 522 travels through first PBS 504 along a first optical path, OP$_1$, shown partially as line AC. Note that, for this embodiment, PBS 504 and PBS 508 are identical. This makes calculating the optical path difference simpler. In other embodiments, PBS 504 and PBS 508 can have different angles α, and different distances d. They can also be made form different materials.

This first beam 522 continues along OP$_1$ as it propagates through wedge tuner 506 and into second PBS 508. In contrast, second beam 524 passes along a second optical path, OP$_2$, shown partially as line AB. Interface 552 directs the incident second beam 524 along OP$_2$ past and external to wedge tuner 506. This second beam 524 then enters second PBS 508, where two interfaces 554 and 556 direct second beam 524 toward first beam 522, so that interface 556 of PBS 506 combines first beam 522 and second beam 524 into output beam 530. This output beam 530 propagates through birefringent crystal 510 before propagating into an optical fiber or other optical device (not shown).

The PBS and wedge tuner sizes are pre-selected for thermal compensation. However, in order to overcome the drawbacks associated with prior art designs, the invention tunes hybrid cell 500 to correct for Free Spectral Range (FSR). Free Spectral Range is the frequency interval between two adjacent transmission peaks of a hybrid cell if a hybrid cell is analyzed by a pair of orthogonally polarized polarizers. The FSR of a hybrid cell is targeted to match the channel spacing of incoming signals, whatever the channel spacing may be. To tune the cell to accommodate FSR, the Optical Path Difference (OPD) between OP$_1$ and OP$_2$ can be set to the FSR of the target frequency by selecting an appropriately dimensioned wedge tuner and crystal. As explained above, the OPD is not the same as the physical difference in path lengths. It is dependent on the refractive index of the material through which the electromagnetic radiation or light signals pass. Exemplary calculations used to correct for FSR and temperature drift are provided below.

Since the distance from point B to the edge of PBS 504 is the same as the distance from point C to the edge of PBS 504, the optical path difference between OP$_1$ and OP$_2$ within PBS 504, designated as OPD$_1$, can be given as:

$$OPD_1 = (AB-AC)n_g \qquad (6)$$

where $n_g$ is the group index of refraction of the PBS glass. For this embodiment, it is assumed that the glass in PBS 504, wedge 506 and PBS 508 is the same, although those skilled in the art will recognize that this need not be the case. The invention can be constructed with PBS 504, wedge 506 and PBS 508 made from different materials.

Applying basic trigonometry, Equation 6 can be rewritten as:

$$OPD_1 = 2(d \sin \alpha)n_g \qquad (7)$$

where, as stated above, d is the thickness of component 542 of PBS 504, and a is the angle of interface 550 with respect to the horizontal.

The optical path length difference between PBSs 504 and 508, designated as OPD$_2$, is given by the equation:

$$OPD_2 = (n_{air} - n_g)L_w \qquad (8)$$

where $n_{air}$ and $n_g$ are the indices of refraction for air and the group index of the glass, and $L_w$ is the length of wedge pair 506. The optical path length difference OPD$_3$ for the second PBS 508 is identical to the first, and is shown by Equation 7 above.

To calculate the optical path length difference OPD$_4$ in birefringent crystal 510, we assume that the crystal is an axis cut and the polarization axis is parallel to the beam 520 direction of travel. Thus, OPD$_4$ is given by the equation:

$$OPD_4 = (n_o - n_e)L_e \qquad (9)$$

where $n_o$ is the ordinary index of refraction of crystal 510, $n_e$ is the extraordinary index of refraction of crystal 510, and $L_c$ is the length of crystal 510. Adding Equations 7, 8, and 9, and counting Equation 7 twice, once for each PBS 504, 508, we get the total optical path difference, OPD$_{tot}$:

$$OPD_{tot} = 4n_g d \sin \alpha - (n_g - n_{air})L_w - (n_e - n_o)L_c \qquad (10)$$

The present invention corrects free spectral range (FSR) and temperature drift. To do this, periodicity of hybrid cell 500 matches the channel spacing of the optical signal, whether the channel spacing is 25 GHz, 50 GHz, 100 GHz., or any other channel spacing lower than, between, or greater than these channel spacings. It will be understood that the above-identified channel spacings are only exemplary, with one skilled in the art understanding that any desired channel spacing may be used.

The center wavelength of the input light or electromagnetic wave should not drift with respect to temperature. Two equations define these conditions, i.e., correct FSR and reducing drift, for cell 500. For FSR correction, cell 500 has characteristics and properties defined by $$\frac{c}{FSR} = 4n_g d \sin \alpha - (n_g - n_{air})L_w - (n_e - n_o)L_c \qquad (11)$$

where c is the speed of light in a vacuum, FSR is the free spectral range, and the other variables are the same as previously defined in Equations 7–10.

For temperature compensation, cell 500 has characteristics and properties as defined by:

$$\frac{dOPD}{dT} = 0 \tag{12}$$

where a change in the optical path difference (dOPD) for a given change in temperature (dT) of the material through which the light passes and the ambient temperature is zero for light having a center wavelength equal to about 1.545 µm. Substituting Equation 10 into Equation 12, we arrive at:

$$\frac{dOPD}{dT} = 4\frac{\partial n_g}{\partial T}d\sin\alpha + 4\frac{\partial d}{\partial T}n_g\sin\alpha - \frac{\partial n_g}{\partial T}L_w + \tag{13}$$
$$(n_{air} - n_g)\frac{\partial L_w}{\partial T} + \frac{\partial(n_o - n_e)}{\partial T}L_c + (n_o - n_e)\frac{\partial L_c}{\partial T}$$

If we let $\beta_1 = \frac{\partial n_g}{\partial T}$, $\beta_2 = \frac{\partial(n_o - n_e)}{\partial T}$, $\alpha_1 = \frac{1}{d} \cdot \frac{\partial d}{\partial T}$, and $\alpha_2 = \frac{1}{L_c} \cdot \frac{\partial L_c}{\partial T}$ where $\alpha_1$ is the thermal expansion coefficient of PBSs 504, 508, and $\alpha_2$ is the thermal expansion coefficient of crystal 510, then Equation 13 can be rewritten as:

$$\frac{dOPD}{dT} = 4\beta_1 d\sin\alpha + 4n_g\alpha_1 d\sin\alpha - \beta_1 L_w + \tag{14}$$
$$(n_{air} - n_g)L_w\alpha_1 + \beta_2 L_c + (n_o - n_e)L_c\alpha_2$$

By combining Equations 11 and 14, we arrive at the following two equations:

$$(n_{air} - n_g)L_w + (n_o - n_e)L_c = \frac{c}{FSR} - 4n_g d\sin\alpha \tag{15}$$

$$[(n_{air} - n_g)\alpha_1 - \beta_1]L_w + (\beta_2 + \alpha_2(n_o - n_e))L_c = -4d\sin\alpha(\beta_1 + \alpha_1 n_g) \tag{16}$$

which we can then solve for the two unknown variables $L_w$ and $L_c$. Note that the values of $\alpha_1$, $\alpha_2$, $\beta_1$, and $\beta_2$ are known for various materials, and can be entered into the equations. One solution to the equations uses the following parameters: $n_o=1.9447$, $n_e=2.1486$, $\alpha=35$ degrees, $\alpha_1 \approx 0.52 \times 10^{-6}$, $\alpha_2 \approx 0.yy \times 10^{-6}$, $\beta_1 \approx 13.7 \times 10^{-6}$, $\beta_2 \approx 0.5 \times 10^{-6}$, $d=1.34$ mm, FSR≈100 GHz, $c=3 \times 10^{11}$ mm/s$^2$, $n_{air} \approx 1.00027$, $n_g \approx 1.44409$. These parameters yield $L_w=4.87$ mm and $L_c=3.42$ mm.

The invention as described above can be used with optical signals anywhere in the C, L, or S bands. It is only necessary to tune cell 500 so that, whatever the target frequency, the lengths of wedge tuner 506 and crystal 510 provide for both FSR and temperature stabilization.

While the above equations yield solutions for the simplified case where hybrid cell 500 is tuned to a particular frequency, the more generalized case proves to be somewhat more complicated. One assumption underlying the above generated equations is that there is no material dispersion, i.e., the index of refraction is wavelength independent. For use of hybrid cell 500 over a range of frequencies, we consider material dispersion.

One common manner of taking material dispersion into account is to consider an average effect over the operating wavelength range. For example, consider two wavelengths representing the upper and lower boundaries for the operating wavelength range, designated generally as $\gamma_1$ and $\gamma_2$. For a periodic structure, the phase delay ($\Delta P$) can be given by the equation:

$$\Delta P = \frac{2\pi\gamma_2}{c}OPD(\gamma_2) - \frac{2\pi\gamma_1}{c}OPD(\gamma_1) = 2\pi m \tag{17}$$

where m is an integer and is equal to $(\gamma_2-\gamma_1)$/FSR. Equation 17 can then be rewritten as:

$$\Delta P = \gamma_2 OPD(\gamma_2) - \gamma_1 OPD(\gamma_1) = \frac{\gamma_2 - \gamma_1}{FSR}c \tag{18}$$

If we substitute Equation 11 into Equation 18, and consider the wavelength dependent index of refraction we arrive at:

$$\Delta P = 4[n_g(\gamma_2)\gamma_2 - n_g(\gamma_1)\gamma_1]d\sin\alpha - \tag{19}$$
$$[n_g(\gamma_2)\gamma_2 - n_g(\gamma_1)\gamma_1]L_w +$$
$$[n_{air}(\gamma_2)\gamma_2 - n_{air}(\gamma_1)\gamma_1]L_w +$$
$$[\Delta n(\gamma_2)\gamma_2 - \Delta n(\gamma_1)\gamma_1]L_c$$
$$= \frac{\gamma_2 - \gamma_1}{FSR}c$$

where $\Delta n = n_e - n_o$ for the crystal.

For the athermal effect, we consider a central wavelength $\gamma_c = (\gamma_2 + \gamma_1)/2$. This leads us to rewrite Equation 11 as:

$$\{\beta_1(\gamma_c) - [(n_{air}(\gamma_c) - n_g(\gamma_c))]\}L_w - [\beta_2(\gamma_c) + \alpha_2\Delta n(\gamma_c)]L_c = $$
$$-4d\sin\alpha[\beta_1(\gamma_c) + \alpha_1 n_g(\gamma_c)] \tag{20}$$

If we then rewrite Equation 19 we get:

$$\{[n_{air}(\gamma_2)\gamma_2 - n_{air}(\gamma_1)\gamma_1] - [n_g(\gamma_2)\gamma_2 - n_g(\gamma_1)\gamma_1]\} \tag{21}$$
$$L_w + [\Delta n(\gamma_2)\gamma_2 - \Delta n(\gamma_1)\gamma_1]L_c =$$
$$\frac{(\gamma_2 - \gamma_1)}{FSR}c - 4d\sin\alpha[n_g(\gamma_2)\gamma_2 - n_g(\gamma_1)\gamma_1]$$

We can then solve Equations 20 and 21 for the values of $L_w$ and $L_c$. These equations will yield more accurate values for $L_w$ and $L_c$ than Equations 15 and 16. However, these calculations are much more complex since it is necessary to take the change in the index of refraction into account over the range of frequencies. Doing this requires the use of Sellmeier equations to determine the index of refraction. Sellmeier equations are well known in the art, and are used to express the dependence of the refractive index on the optical wavelength. Sellmeier equations of many of the materials selected are available in literature and standard references.

The present invention, as described above, provides better long term stability than the crystals of the prior art. The invention further provides for less material dispersion and smaller CWL drift over a given temperature range than crystal designs. The invention can be used with signals anywhere in the C, L, and S bands of the spectrum, including, but not limited to, signals at 1310 nm, signals at 1550 nm, signals at 1545 nm, signals greater or lesser than 1310 nm, signals greater or lesser than 1550 nm, and signals greater or lesser than 1545 nm.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical device through which propagates a first beam and a second beam, the first beam propagating through the optical device along a first optical path and the second beam propagating through the optical device along a second optical path, the optical device comprising:

a first optical component having a first length, the first optical component receiving the first beam along the first optical path;

a second optical component optically coupled to said first optical component, said second optical component having a second length and being adapted to receive the first beam and the second beam, and a first polarizing beam splitter and a second polarizing beam splitter, said first polarizing beam splitter being optically coupled to said first optical component and said second polarizing beam splitter being disposed between said first optical component and said second optical component, wherein said first length of said first optical component and said second length of said second optical component are selected such that an optical path difference between the first optical path length of said first optical path and a second optical path length of said second optical path is approximately inversely proportional to a free spectral range of a target wavelength of either the first beam or the second beam, and wherein said first length and said second length are defined by the equations $$(n_{air} - n_g)L_w + (n_o - n_e)L_c = \frac{c}{FSR} - 4n_g d\sin\alpha \text{ and}$$

$$[(n_{air} - n_g)\alpha_1 - \beta_1]L_w + (\beta_2 + \alpha_2(n_o - n_e))L_c = -4d\sin\alpha(\beta_1 + \alpha_1 n_g),$$

where
$n_{air}$ = refractive index of air.
$n_g$ = group index of the glass.
$L_2$ = length of first optical component.
$n_o$ = ordinary index of refraction of the second optical component.
$n_e$ = extraordinary index of refraction of the second optical component.
$L_c$ = length of the second optical component.
c = speed of light in a vacuum.
FSR = free spectral range.
d = distance between a first interface and a second interface of the first polarizing beam splitter.
$\alpha$ = angle of the first interface with respect to horizontal.
$\alpha_1$ = thermal expansion coefficient of said first and said second polarizing beam splitters.

$\alpha_2$ = thermal expansion coefficient of said second optical component.

$\beta_1 = \frac{\partial n_g}{\partial T}$, where $\partial T$ is the change in ambient temperature.

$\beta_2 = \frac{\partial(n_o - n_e)}{\partial T}$, where $\partial T$ is the change in ambient temperature.

2. The optical device of claim 1, wherein said first optical component comprises a wedge tuner.

3. The optical device of claim 1, wherein said second optical component comprises a birefringent optical crystal.

4. The optical device of claim 1, wherein said target wavelength is in any one of the C, L, and S bands.

5. The optical device of claim 1, wherein said first length and said second length are selected such that said optical path difference does not change over a given temperature range.

6. An optical component comprising:

a first polarizing beam splitter that receives an input light beam and splits said input light beam into a first beam along a first optical path and a second beam along a second optical path;

a wedge tuner having a first length optically coupled with said first polarizing beam splitter along said first optical path;

a second polarizing beam splitter optically coupled with said wedge tuner along said first optical path, said second polarizing beam splitter being optically coupled with said first polarizing beam splitter along said second optical path; and an optical crystal optically coupled with said second polarizing beam splitter, said optical crystal having a second length, wherein said second polarizing beam splitter combines said first and said second beams and passes said combined beam to said optical crystal and wherein said first length and said second length are selected such that an optical path difference between a first optical path length of said first optical path and a second optical path length of said second optical path is approximately inversely proportional to a free spectral range of a target wavelength of said input light beam, and wherein said first length and said second length are defined by the equations $$\{\beta_1(\gamma_c) - [(n_{air}(\gamma_c) - n_g(\gamma_c)]\}L_w -$$
$$[\beta_2(\gamma_c) + \alpha_2\Delta n(\gamma_c)]L_c = -4d\sin\alpha[\beta_1(\gamma_c) + \alpha_1 n_g(\gamma_c)] \text{ and}$$
$$\{[n_{air}(\gamma_2)\gamma_2 - n_{air}(\gamma_1)\gamma_1] - [n_g(\gamma_2)\gamma_2 - n_g(\gamma_1)\gamma_1]\}L_w +$$
$$[\Delta n(\gamma_2)\gamma_2 - \Delta n(\gamma_1)\gamma_1]L_c = \frac{(\gamma_2 - \gamma_1)}{FSR}c - 4d\sin\alpha[n_g(\gamma_2)\gamma_2 - n_g(\gamma_1)\gamma_1]$$

where
$n_{air}$ = refractive index of air.
$n_g$ = group index of the glass.
$L_w$ = length of first optical component.
$\Delta n = n_e - n_o$, where $n_o$ is ordinary index of refraction of the second optical component and $n_e$ is extraordinary index of refraction of the second optical component.

-continued $L_c$ = length of the second optical component
c = speed of light in a vacuum
FSR = free spectral range
d = distance between a first interface and a second interface of the first polarizing beam splitter
α = angle of the first interface with respect to horizontal
$α_1$ = thermal expansion coefficient of said first and said second polarizing beam splitters.
$α_2$ = thermal expansion coefficient of said second optical component.

$$\beta_1 = \frac{\partial n_g}{\partial T}, \text{ where } \partial T \text{ is the change in ambient temperature.}$$

$$\beta_2 = \frac{\partial (n_o - n_e)}{\partial T}, \text{ where } \partial T \text{ is the change in ambient temperature.}$$

$γ_1, γ_2$ = upper and lower boundaries for the operating wavelength range
$γ_c = (γ_2 + γ_1)/2$.

7. The optical component of claim 6, wherein said target wavelength is in any one of the C, L, and S bands.

8. The optical component of claim 6, wherein said first length and said second length are also selected such that said optical path difference does not change over a given temperature range.

9. The optical component of claim 8, wherein the temperature range is from approximately −45 to approximately 85 degrees C.

10. The optical component of claim 6, wherein said free spectral range is about 100 GHz, said first length is approximately 4.87 mm and said second length is approximately 3.42 mm.

11. The optical component of claim 6, wherein said first and second polarizing beam splitters comprise glass.

12. The optical component of claim 6, wherein said first and second polarizing beam splitters and said wedge tuner comprise glass.

13. The optical component of claim 6, wherein said optical crystal comprises any one of an Yttrium Orthovanadate ($YVO_4$) Crystal, a Calcite ($CaCO_3$) crystal, a rutile ($TiO_2$) crystal, and an alpha-BBO crystal.

14. The optical component of claim 6, wherein the optical component functions as an interleaver/de-interleaver.

* * * * *

UNITED STATES PATENT AND TRADEMARK OFFICE
CERTIFICATE OF CORRECTION

PATENT NO. : 7,106,508 B2
APPLICATION NO. : 10/654261
DATED : September 12, 2006
INVENTOR(S) : Du et al.

It is certified that error appears in the above-identified patent and that said Letters Patent is hereby corrected as shown below:

Drawings
Delete drawing sheet 7 and replace with the attached sheet 7

Column 7
Line 4, change "130" to --132--

Column 8
Line 60, after "blocks", change "120" to --110--

Column 12
Line 27, remove "288"

Column 14
Line 57, change "$\alpha_j$" to --$\alpha_i$-- (1st occurrence)

Column 17
Line 21, change "are, and repectively" to --are [$R_1$, $T_1$], [$R_2$, $T_2$] and [$R_3$, $T_3$] respectively--

Column 19
Line 50, change "506" to --508--

Column 20
Line 23, change "a" to --$\alpha$--

UNITED STATES PATENT AND TRADEMARK OFFICE
CERTIFICATE OF CORRECTION

PATENT NO. : 7,106,508 B2
APPLICATION NO. : 10/654261
DATED : September 12, 2006
INVENTOR(S) : Du et al.

It is certified that error appears in the above-identified patent and that said Letters Patent is hereby corrected as shown below:

<u>Column 23</u>
Line 57, change "$L_2$" to --$L_w$--

Signed and Sealed this

Twenty-first Day of October, 2008

JON W. DUDAS
*Director of the United States Patent and Trademark Office*